(12) United States Patent
Hou et al.

(10) Patent No.: US 12,462,154 B2
(45) Date of Patent: Nov. 4, 2025

(54) METHOD AND SYSTEM FOR ASPECT-LEVEL SENTIMENT CLASSIFICATION BY MERGING GRAPHS

(71) Applicant: Chinabank Payment (Beijing) Technology Co., Ltd., Beijing (CN)

(72) Inventors: Xiaochen Hou, Mountain View, CA (US); Peng Qi, Mountain View, CA (US); Guangtao Wang, Cupertino, CA (US); Zhitao Ying, Palo Alto, CA (US); Jing Huang, Mountain View, WA (US); Xiaodong He, Beijing (CN); Bowen Zhou, Beijing (CN)

(73) Assignee: CHINABANK PAYMENT (BEIJING) TECHNOLOGY CO., LTD., Beijing (CN)

( * ) Notice: Subject to any disclaimer, the term of this patent is extended or adjusted under 35 U.S.C. 154(b) by 929 days.

(21) Appl. No.: 17/676,775

(22) Filed: Feb. 21, 2022

(65) Prior Publication Data
US 2023/0267322 A1 Aug. 24, 2023

(51) Int. Cl.
*G06N 3/08* (2023.01)
*G06F 18/20* (2023.01)
(Continued)

(52) U.S. Cl.
CPC ............ *G06N 3/08* (2013.01); *G06F 18/213* (2023.01); *G06F 18/29* (2023.01); *G06F 40/205* (2020.01); *G06N 3/048* (2023.01)

(58) Field of Classification Search
CPC .......... G06N 3/08; G06N 3/048; G06N 3/045; G06N 5/01; G06N 5/022; G06F 18/213;
(Continued)

(56) References Cited

U.S. PATENT DOCUMENTS

2021/0240933 A1* 8/2021 Song .................... G06F 40/205

FOREIGN PATENT DOCUMENTS

JP 2004145433 A * 5/2004

OTHER PUBLICATIONS

Hou, Xiaochen, et al. "Selective attention based graph convolutional networks for aspect-level sentiment classification." arXiv preprint arXiv:1910.10857 (2019). (Year: 2019).*

(Continued)

*Primary Examiner* — Michael J Huntley
*Assistant Examiner* — Jasmine Thanh Thai
(74) *Attorney, Agent, or Firm* — Scully, Scott, Murphy & Presser, P.C.

(57) ABSTRACT

System and method for aspect-level sentiment classification. The system includes a computing device, the computing device has a processer and a storage device storing computer executable code. The computer executable code is configured to: receive an aspect term-sentence pair; embed the aspect term-sentence pair; parse the sentence using multiple parsers to obtain dependency trees, and perform edge union to obtain a merged graph; combine the embedding and the merged graph to obtain a relation graph; perform a relation graph neural network on the relation graph; extract hidden representation of the aspect term from updated relation neural network; and classify the aspect term based on the extracted representation to obtain a predicted classification label of the aspect term. During training, the computer executable code is further configured to calculate a loss function based on the predicted label and the ground truth label, and adjust parameters of models.

20 Claims, 12 Drawing Sheets

(51) Int. Cl.
   G06F 18/213     (2023.01)
   G06F 40/205     (2020.01)
   G06N 3/048      (2023.01)
(58) Field of Classification Search
   CPC ...... G06F 18/29; G06F 40/205; G06F 40/211;
              G06F 40/284; G06F 40/279; G06F 40/30
   See application file for complete search history.

(56) References Cited

OTHER PUBLICATIONS

Wang, Kai, et al. "Relational graph attention network for aspect-based sentiment analysis." arXiv preprint arXiv:2004.12362 (2020). (Year: 2020).*
Y. Li, X. Sun and M. Wang, "Embedding Extra Knowledge and A Dependency Tree Based on A Graph Attention Network for Aspect-based Sentiment Analysis," 2021 International Joint Conference on Neural Networks (IJCNN), Shenzhen, China, 2021, pp. 1-8, doi: 10.1109/IJCNN52387.2021.9533695 (Year: 2021).*
Zhou, Jie, et al. "Sk-gcn: Modeling syntax and knowledge via graph convolutional network for aspect-level sentiment classification." Knowledge-Based Systems 205 (2020): 106292. (Year: 2020).*
Velickovic, Petar, et al. "Graph attention networks." arXiv preprint arXiv1710.10903 (2017). (Year: 2017).*
Tang, Hao, et al. "Dependency graph enhanced dual-transformer structure for aspect-based sentiment classification." Proceedings of the 58th annual meeting of the association for computational linguistics. 2020. (Year: 2020).*
Kumar, Abhishek, Daisuke Kawahara, and Sadao Kurohashi. "Knowledge-enriched two-layered attention network for sentiment analysis." arXiv preprint arXiv:1805.07819 (2018). (Year: 2018).*
Zhaopeng Tu, Wenbin Jiang, Qun Liu, and Shouxun Lin, Dependency forest for sentiment analysis, 2012, CCF International Conference on Natural Language Processing and Chinese Computing, 69â77. (Year: 2012).*
Li, Lishuang, Yang Liu, and AnQiao Zhou. "Hierarchical attention based position-aware network for aspect-level sentiment analysis." Proceedings of the 22nd conference on computational natural language learning. 2018. (Year: 2018).*
Busbridge, Dan, et al. "Relational graph attention networks." arXiv preprint arXiv:1904.05811 (2019). (Year: 2019).*
Zhang, Chen, Qiuchi Li, and Dawei Song. "Aspect-based sentiment classification with aspect-specific graph convolutional networks." arXiv preprint arXiv:1909.03477 (2019). (Year: 2019).*
Sun, Kai, et al. "Aspect-level sentiment analysis via convolution over dependency tree." Proceedings of the 2019 conference on empirical methods in natural language processing and the 9th international joint conference on natural language processing (EMNLP-IJCNLP). 2019. (Year: 2019).*
Tang, Anfu, et al. "Does constituency analysis enhance domain-specific pre-trained BERT models for relation extraction?." arXiv preprint arXiv:2112.02955 (2021). (Year: 2021).*
Courtin, Jacques, and Damien Genthial. "Parsing with dependency relations and robust parsing." Processing of Dependency-Based Grammars. 1998. (Year: 1998).*
Chen, Xiao, and Chunyu Kit. "Higher-order constituent parsing and parser combination." Proceedings of the 50th Annual Meeting of the Association for Computational Linguistics (vol. 2: Short Papers). 2012. (Year: 2012).*
Fossum, Victoria, and Kevin Knight. "Combining constituent parsers." Proceedings of Human Language Technologies: The 2009 Annual Conference of the North American Chapter of the Association for Computational Linguistics, Companion vol. Short Papers. 2009. (Year: 2009).*
Green, Nathan, and Zdeněk Žabokrtský. "Hybrid combination of constituency and dependency trees into an ensemble dependency parser." Proceedings of the workshop on innovative hybrid approaches to the processing of textual data. 2012. (Year: 2012).*

Martins, André Filipe Torres, et al. "Stacking dependency parsers." Proceedings of the 2008 Conference on Empirical Methods in Natural Language Processing. 2008. (Year: 2008).*
Zhang, Yue, and Stephen Clark. "A tale of two parsers: Investigating and combining graph-based and transition-based dependency parsing." Proceedings of the 2008 Conference on Empirical Methods in Natural Language Processing. 2008. (Year: 2008).*
Ren, Xiaona, Xiao Chen, and Chunyu Kit. "Combine Constituent and Dependency Parsing via Reranking." IJCAI. 2013. (Year: 2013).*
Zhang, Hui, et al. "K-best combination of syntactic parsers." Proceedings of the 2009 Conference on Empirical Methods in Natural Language Processing. 2009. (Year: 2009).*
Dan Busbridge, Dane Sherburn, Pietro Cavallo, and Nils Y Hammerla, Relational graph attention networks, 2019, arXiv:1904.05811.
Peng Chen, Zhongqian Sun, Lidong Bing, and Wei Yang, Recurrent attention network on memory for aspect sentiment analysis, 2017, Proceedings of the 2017 Conference on Empirical Methods in Natural Language Processing, 452-461.
Jacob Devlin, Ming-Wei Chang, Kenton Lee, and Kristina Toutanova, BERT: Pre-training of deep bidirectional transformers for language understanding, 2019, Proceedings of the 2019 Conference of The North American Chapter of the Association for Computational Inguistics: Human Language Technologies, V1:4171-4186.
Li Dong, Furu Wei, Chuanqi Tan, Duyu Tang, Ming Zhou, and Ke Xu, Adaptive recursive neural network for target-dependent twitter sentiment classification, 2014, Proceedings of the 52nd Annual Meeting of the Association for Computational Linguistics, v2:49-54.
Feifan Fan, Yansong Feng, and Dongyan Zhao, Multi-grained attention network for aspect-level sentiment classification, 2018, Proceedings of the 2018 Conference on Empirical Methods in Natural Language Processing, 3433-3442.
Zhifang Fan, Zhen Wu, Xin-Yu Dai, Shujian Huang, and Jiajun Chen, Target-oriented opinion words extraction with target-fused neural sequence labeling, 2019, Proceedings of the 2019 Conference of the North American Chapter of the Association for Computational Linguistics: Human Language Technologies, v1:2509-2518.
Luheng He, Kenton Lee, Mike Lewis, and Luke Zettle moyer, Deep semantic role labeling: What works and what's next, 2017, Proceedings of the 55th Annual Meeting of the Association for Computational Linguistics, v1:473-483.
Ruidan He, Wee Sun Lee, Hwee Tou Ng, and Daniel Dahlmeier, Effective attention modeling for aspect-level sentiment classification, 2018, Proceedings of the 27th International Conference on Computational Linguistics, 1121-1131.
Binxuan Huang and Kathleen M Carley, Syntax aware aspect level sentiment classification with graph attention networks, 2019, Proceedings of the 2019 Conference on Empirical Methods in Natural Language Processing and the 9th International Joint Conference on Natural Language Processing (EMNLP-IJCNLP), 5469-5477.
Thomas N Kipf and Max Welling, Semisupervised classification with graph convolutional networks, 2016, arXiv:1609.02907.
Nikita Kitaev and Dan Klein, Constituency parsing with a self-attentive encoder, 2018, Proceedings of the 56th Annual Meeting of the Association for Computational Linguistics, v1:2676-2686.
Lishuang Li, Yang Liu, and AnQiao Zhou, Hierarchical attention based position-aware network for aspect-level sentiment analysis, 2018, Proceedings of the 22nd Conference on Computational Natural Language Learning, 181-189.
Qimai Li, Zhichao Han, and Xiao-Ming Wu, Deeper insights into graph convolutional networks for semi-supervised learning, 2018, Thirty-Second AAAI Conference on Artificial Intelligence (AAAI-18), 3538-3545.
Xin Li, Lidong Bing, Wai Lam, and Bei Shi, Transformation networks for target oriented sentiment classification, 2018, arXiv:1805.01086.
Jiangming Liu and Yue Zhang, Attention modeling for targeted sentiment, 2017, Proceedings of the 15th Conference of the European Chapter of the Association for Computational Linguistics, v2:572-577.

(56) References Cited

OTHER PUBLICATIONS

Christopher Manning, Mihai Surdeanu, John Bauer, Jenny Finkel, Steven Bethard, and David McClosky, The Stanford CoreNLP natural language processing toolkit, 2014, Proceedings of 52nd Annual Meeting of the Association for Computational Linguistics: System Demonstrations, 55-60.

Thien Hai Nguyen and Kiyoaki Shirai, Phrasernn: Phrase recursive neural network for aspect-based sentiment analysis, 2015, Proceedings of the 2015 Conference on Empirical Methods in Natural Language Processing, 2509-2514.

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala, Pytorch: An imperative style, high-performance deep learning library, 2019, Advances in Neural Information Processing Systems 32 (NeuIPS 2019), 8024-8035.

Peng Qi, Yuhao Zhang, Yuhui Zhang, Jason Bolton, and Christopher D. Manning, Stanza: A Python natural language processing toolkit for many human languages, 2020, Proceedings of the 58th Annual Meeting of the Association for Computational Linguistics: System Demonstrations, 101-108.

Alexander Rietzler, Sebastian Stabinger, Paul Opitz, and Stefan Engl, Adapt or get left behind: Domain adaptation through bert language model finetuning for aspect-target sentiment classification, 2019, arXiv:1908.11860.

Devendra Singh Sachan, Yuhao Zhang, Peng Qi, and William Hamilton, Do syntax trees help pretrained transformers extract information? 2021, arXiv:2008.09084.

Youwei Song, Jiahai Wang, Tao Jiang, Zhiyue Liu, and Yanghui Rao, Attentional encoder network for targeted sentiment classification, 2019, arXiv:1902.09314.

Nitish Srivastava, Geoffrey Hinton, Alex Krizhevsky, Ilya Sutskever, and Ruslan Salakhutdinov, Dropout: a simple way to prevent neural networks from overfitting, 2014, The Journal of Machine Learning Research, 15(1):1929-1958.

Kai Sun, Richong Zhang, Samuel Mensah, Yongyi Mao, and Xudong Liu, Aspect-level sentiment analysis via convolution over dependency tree, 2019, Proceedings of the 2019 Conference on Empirical Methods in Natural Language Processing and the 9th International Joint Conference on Natural Language Processing (EMNLP-IJCNLP), 5679-5688.

Duyu Tang, Bing Qin, Xiaocheng Feng, and Ting Liu, Effective LSTMs for target dependent sentiment classification, 2015, arXiv:1512.01100.

Duyu Tang, Bing Qin, and Ting Liu, Aspect level sentiment classification with deep memory network, 2016, arXiv:1605.08900.

Hao Tang, Donghong Ji, Chenliang Li, and Qiji Zhou, Dependency graph enhanced dual transformer structure for aspect-based sentiment classification, 2020, Proceedings of the 58th Annual Meeting of the Association for Computational Linguistics, 6578-6588.

Zhaopeng Tu, Wenbin Jiang, Qun Liu, and Shouxun Lin, Dependency forest for sentiment analysis, 2012, CCF International Conference on Natural Language Processing and Chinese Computing, 69-77.

Petar Veli.ckovi'c, Guillem Cucurull, Arantxa Casanova, Adriana Romero, Pietro Lio, and Yoshua Bengio, Graph attention networks, 2017, arXiv:1710.10903.

Bailin Wang and Wei Lu, Learning latent opinions for aspect-level sentiment classification, 2018, Thirty-Second AAAI Conference on Artificial Intelligence, v32(1):5537-5544.

Guangtao Wang, Rex Ying, Jing Huang, and Jure Leskovec, Direct multi-hop attention based graph neural network, 2020, arXiv:2009.14332.

Kai Wang, Weizhou Shen, Yunyi Yang, Xiaojun Quan, and Rui Wang, Relational graph attention network for aspect-based sentiment analysis, 2020, arXiv:2004.12362.

Minjie Wang, Lingfan Yu, Da Zheng, Quan Gan Gan, Yu Gai, Zihao Ye, Mufei Li, Jinjing Zhou, Qi Huang, Chao Ma, Ziyue Huang, Qipeng Guo, Hao Zhang, Haibin Lin, Junbo Zhao, Jinyang Li, Alexander Smola, and Zheng Zhang, Deep graph library: Towards efficient and scalable deep learning on graphs, 2019, arXiv:1909.01315.

Shuai Wang, Sahisnu Mazumder, Bing Liu, Mianwei Zhou, and Yi Chang, Target-sensitive memory networks for aspect sentiment classification, 2018, Proceedings of the 56th Annual Meeting of the Association for Computational Linguistics, v1.957-967.

Xiaoyu Xing, Zhijing Jin, Di Jin, Bingning Wang, Qi Zhang, and Xuan-Jing Huang, Tasty burgers, soggy fries: Probing aspect robustness in aspect based sentiment analysis, 2020, Proceedings of the 2020 Conference on Empirical Methods in Natural Language Processing (EMNLP), 3594-3605.

Hu Xu, Bing Liu, Lei Shu, and Philip S Yu, BERT post-training for review reading comprehension and aspect-based sentiment analysis, 2019, arXiv:1904.02232.

Chen Zhang, Qiuchi Li, and Dawei Song, Aspect-based sentiment classification with aspect specific graph convolutional networks, 2019, Proceedings of the 2019 Conference on Empirical Methods in Natural Language Processing and the 9th International Joint Conference on Natural Language Processing (EMNLP-IJCNLP), 4568-4578.

Yuhao Zhang, Peng Qi, and Christopher D Manning, Graph convolution over pruned dependency trees improves relation extraction, 2018, Proceedings of the 2018 Conference on Empirical Methods in Natural Language Processing, 2205-2215.

Shiliang Zheng and Rui Xia, Left-center-right separated neural network for aspect-based sentiment analysis with rotatory attention, 2018, arXiv:1802.00892.

\* cited by examiner

Table 1

| Dataset | Positive | | Neutral | | Negative | |
|---|---|---|---|---|---|---|
| | Train | Test | Train | Test | Train | Test |
| Laptop | 987 | 341 | 460 | 169 | 866 | 128 |
| Restaurant | 2164 | 728 | 633 | 196 | 805 | 196 |
| Twitter | 1561 | 173 | 3127 | 346 | 1560 | 173 |

FIG. 6

Table 2

| Category | Model | 14Rest | | 14Lap | | Twitter | |
|---|---|---|---|---|---|---|---|
| | | Acc | Macro-F1 | Acc | Macro-F1 | Acc | Macro-F1 |
| BERT | BERT-SPC | 84.46 | 76.98 | 78.99 | 75.03 | 73.55 | 72.14 |
| | AEN-BERT | 83.12 | 73.76 | 79.93 | 76.31 | 74.71 | 73.13 |
| BERT+DT | DGEDT-BERT | 86.3 | 80.0 | 79.8 | 75.6 | 77.9 | 75.4 |
| BERT+RDT | R-GAT+BERT | 86.60 | 81.35 | 78.21 | 74.07 | 76.15 | 74.88 |
| Ours | GraphMerge | 87.32 | 81.95 | 81.35 | 78.65 | 78.18 | 76.52 |

FIG. 7

Table 3

| Model | 14Rest | | 14Lap | | Twitter | |
|---|---|---|---|---|---|---|
| | Acc | Macro-F1 | Acc | Macro-F1 | Acc | Macro-F1 |
| BERT-baseline | 83.43±0.52 | 74.94±1.37 | 77.34±0.90 | 72.77±1.96 | 73.47±0.89 | 72.63±0.82 |
| GAT-baseline with Stanza | 84.29±0.30 | 75.75±1.11 | 77.84±0.27 | 74.0±0.55 | 73.82±0.70 | 72.72±0.42 |
| RGAT with Stanza | 84.53±0.66 | 77.29±1.42 | 77.99±0.62 | 74.35±0.60 | 73.99±0.48 | 72.76±0.33 |
| RGAT with Berkeley | 84.41±0.86 | 76.63±1.38 | 78.09±1.24 | 73.65±1.76 | 74.07±0.67 | 72.65±0.74 |
| RGAT with CoreNLP | 83.86±0.32 | 76.03±0.88 | 78.12±1.02 | 73.86±1.72 | 73.96±0.93 | 72.83±0.95 |
| Label-Ensemble | 84.68±0.95 | 77.21±1.54 | 78.40±1.51 | 74.36±2.45 | 74.59±0.46 | 73.51±0.43 |
| Feature-Ensemble | 84.64±0.77 | 77.06±1.45 | 78.68±0.69 | 74.80±0.92 | 74.62±0.76 | 73.61±0.73 |
| GraphMerge | 85.16±0.53 | 77.91±0.87 | 80.00±0.63 | 76.50±0.64 | 74.74±0.93 | 73.66±0.88 |

FIG. 8

Table 4

| Model | 14Rest | | 14Lap | | Twitter | |
|---|---|---|---|---|---|---|
| | Acc | Macro-F1 | Acc | Macro-F1 | Acc | Macro-F1 |
| GraphMerge | 85.16±0.53 | 77.91±0.87 | 80.00±0.63 | 76.50±0.64 | 74.74±0.93 | 73.66±0.88 |
| - Edge type | 84.25±0.59 | 76.15±1.24 | 78.65±0.51 | 74.76±0.71 | 74.37±1.08 | 73.25±0.85 |
| - Position | 84.36±0.36 | 75.92±1.18 | 78.37±0.31 | 74.51±0.48 | 74.28±1.39 | 73.34±1.35 |
| - (Edge type + Position) | 84.16±0.31 | 75.38±0.69 | 78.09±0.27 | 74.29±0.64 | 73.41±0.63 | 72.52±0.62 |
| Edge Intersection | 84.59±0.61 | 77.06±1.07 | 78.65±0.94 | 74.86±1.42 | 74.68±0.83 | 73.45±0.73 |

FIG. 9

Table 5

| | Aspect Terms | Opinion Words | Coverage |
|---|---|---|---|
| Laptop | 638 | 467 | 73.20% |
| Restaurant | 1120 | 852 | 76.07% |

FIG. 10

Table 6

| Dataset | Positive | Neutral | Negative | Total |
|---|---|---|---|---|
| Laptop | 883 | 407 | 587 | 1877 |
| Restaurant | 1953 | 473 | 1104 | 3530 |

FIG. 13

Table 7

| Model | 14Rest | 14Lap |
|---|---|---|
|  | Acc → ARS | Acc → ARS |
| BERT | 83.04 → 54.82 (↓28.22) | 77.59 → 50.94 (↓26.65) |
| RGAT with Berkeley | 84.41 → 56.54 (↓27.87) | 78.09 → 51.37 (↓26.72) |
| RGAT with CoreNLP | 83.86 → 55.76 (↓28.10) | 78.12 → 52.27 (↓25.85) |
| RGAT with Stanza | 84.53 → 56.34 (↓28.19) | 77.99 → 51.20 (↓26.79) |
| GraphMerge | 85.16 → 57.46 (↓27.70) | 80.00 → 52.90 (↓27.10) |

FIG. 14

METHOD AND SYSTEM FOR ASPECT-LEVEL SENTIMENT CLASSIFICATION BY MERGING GRAPHS

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entirety and to the same extent as if each reference were individually incorporated by reference.

FIELD OF THE DISCLOSURE

The present disclosure relates generally to sentiment analysis of text, and more specifically related to methods and systems for aspect-level sentiment classification by merging graphs.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Aspect-level sentiment classification is a fine-grained sentiment analysis task, which aims to identify the sentiment polarity (e.g., positive, negative, or neutral) of a specific aspect term appearing in a sentence, such as product reviews. FIG. 1 shows a sentence "The exterior, unlike the food, is unwelcoming." The polarities of aspect terms "exterior" and "food" are negative and positive, respectively. This task has many applications, such as assisting customers to filter online reviews or make purchase decisions on e-commerce websites.

Recent studies have shown that syntactic information such as dependency trees is very effective in capturing long-range syntactic relations that are obscure from the surface form (Yuhao Zhang, Peng Qi, and Christopher D Manning, Graph convolution over pruned dependency trees improves relation extraction, 2018, EMNLP, 2205-2215). Several successful approaches employed graph neural network (GNN) (Thomas N Kipf and Max Welling, Semi supervised classification with graph convolutional networks, 2016, arXiv:1609.02907) model over dependency trees to aspect-level sentiment classification (Binxuan Huang and Kathleen M Carley, Syntax aware aspect level sentiment classification with graph attention networks, 2019, EMNLP-IJCNLP, 5469-5477; Chen Zhang, Qiuchi Li, and Dawei Song, Aspect-based sentiment classification with aspect specific graph convolutional networks, 2019, EMNLP-IJCNLP, 4568-4578; Kai Sun, Richong Zhang, Samuel Mensah, Yongyi Mao, and Xudong Liu, Aspect-level sentiment analysis via convolution over dependency tree, 2019, EMNLP-IJCNLP, 5679-5688; Kai Wang, Weizhou Shen, Yunyi Yang, Xiaojun Quan, and Rui Wang, Relational graph attention network for aspect-based sentiment analysis, 2020, arXiv:2004.12362, hereinafter "Wang, 2020"), which demonstrate that syntactic information is helpful for associating the aspect term with relevant opinion words more directly for increased robustness in sentiment classification.

However, existing approaches are vulnerable to parsing errors (Wang, 2020). For example, as shown in FIG. 1, curved arrows above the sentence indicates parsing of the sentence to predict sentiment label for aspect word "food," and curved arrows below the sentence indicates parsing of the sentence to predict sentiment label for aspect word "exterior." The parse of the sentence can mislead models to predict negative sentiment for the aspect term "food" with its direct association to the word "unwelcoming". Despite their high edge-wise parsing performance on standard benchmarks, state-of-the-art dependency parsers usually struggle to predict flawless parse trees especially in out-of-domain settings. This poses great challenge to dependency-based methods that rely on these parse trees, where the added benefit from syntactic structure does not always prevail the noise introduced by model-predicted parses (Luheng He, Kenton Lee, Mike Lewis, and Luke Zettlemoyer, Deep semantic role labeling: What works and what's next, 2017, In Proceedings of the 55$^{th}$ Annual Meeting of the Association for Computational Linguistics, v1:473-483); Devendra Singh Sachan, Yuhao Zhang, Peng Qi, and William Hamilton, Do syntax trees help pretrained transformers extract information?, 2021, arXiv:2008.09084).

Therefore, an unaddressed need exists in the art to learn effect between distant nodes to classify aspect-level sentiment accurately.

SUMMARY OF THE DISCLOSURE

In certain aspects, the present disclosure provides GraphMerge, a graph ensemble technique to help dependency-based models mitigate the effect of parsing errors. In certain embodiments, the disclosed technique is based on the observation that different parsers, especially ones with different inductive biases, often err in different ways. For instance, in FIG. 1, the parse under the sentence is incorrect around "unlike the food," but it nevertheless correctly associates "unwelcoming" with the other aspect term "exterior," and therefore is less likely to mislead model predictions. Given dependency trees from multiple parses, instead of assigning each dependency tree a separate set of model parameters and ensembling model predictions or dependency-based representations of the same input, the disclosure combines the different dependency trees before applying representation learners such as GNNs. Specifically, the disclosure takes the union of the edges in all dependency trees from different parsers to construct an ensemble graph, before applying GNNs over it. This exposes the GNN model to various graph hypotheses at once, and allows the model to learn to favor edges that contribute more to the task. In certain embodiments, to retain the syntactic dependency information between words in the original dependency trees, the disclosure also defines two different edge types: parent-to-child and child-to-parent, which are encoded by applying relational graph attention networks (RGAT) (Dan Busbridge, Dane Sherburn, Pietro Cavallo, and Nils Y Hammerla, Relational graph attention networks. 2019, arXiv:1904.05811) on the ensemble graph.

Certain embodiments of the present disclosure have the following several advantages. Firstly, since GraphMerge combines dependency trees from different parsers, the GNN models can be exposed to multiple parsing hypotheses and learn to choose edges that are more suitable for the task from data. As a result, the model is less reliant on any specific parser and more robust to parsing errors. Secondly, this improved robustness to parsing errors does not require any additional computational cost, since the disclosure is still applying GNNs to a single graph with the same number of nodes. Last but not least, GraphMerge helps prevent GNNs from overfitting by limiting over-parameterization. Aside from keeping the GNN computation over a single graph to avoid separate parameterization for each parse tree, GraphMerge also introduces more edges in the graph when parses differ, which reduces the diameter of graphs. As a result, fewer layers of GNNs are required to learn good representations from the graph, alleviating the over smoothing problem.

In certain aspects, the present disclosure relates to a system. In certain embodiments, the system includes a computing device, and the computing device has a processor and a storage device storing computer executable code. The computer executable code, when executed at the processor, is configured to:

receive an aspect term-sentence pair, where the aspect term-sentence pair comprises an aspect term and a sentence, and the sentence has the aspect term;

embed the aspect term-sentence pair to obtain embedding of each word in the sentence;

parse the sentence using multiple parsers to obtain multiple dependency trees;

perform edge union on the dependency trees to obtain a merged graph, where each node and each edge in the dependency trees are included in the merged graph;

represent each node in the merged graph by corresponding one of the embeddings of the words to obtain a relation graph;

perform a relation neural network on the relation graph to obtain updated relation neural network;

extract hidden representation of the aspect term from the updated relation neural network to obtain extracted representation of the aspect term; and classify the aspect term based on the extracted representation to obtain a predicted classification label of the aspect term.

In certain embodiments, when the aspect term-sentence pair is used for training the model and the aspect term has a ground truth label in regard to the sentence, the computer executable code is further configured to: receive the ground true label; calculate a loss function based on the predicted classification label of the aspect term and the ground truth classification label of the aspect term; and adjust parameters of models in the computer executable code based on the loss function.

In certain embodiments, the computer executable code is further configured to add a position dimension to the embedding of each of the words.

In certain embodiments, the number of the parsers is in a range of 2-5 or more. In certain embodiments, the number of the parsers is three, and the three parsers are CoreNLP, Stanza, and Berkeley neural parser.

In certain embodiments, the computer executable code is further configured to add a child-to-parent relation to each parent-to-child relation to the merged graph, and add a self-loop to each node in the merged graph, so as to obtain the relation graph.

In certain embodiments, the relation neural network is a relational graph attention network (RGAT).

In certain embodiments, hidden representation of node i in the relation graph at l-th layer of the RGAT is calculated by: $h_i^{(l)} = \|_{k=1}^{K} \sigma(\Sigma_{j \in N_i} \alpha_{ij}^k W^k h_i^{(l-1,k)})$. K is a number of attention heads, $N_i$ is a neighborhood of node i in the relation graph, $\|$ a concatenation operation, $W^k$ represents learnable weights in the RGAT, and $\sigma$ represents a ReLU activation function, and $\alpha_{ij}^k$ is an attention score between node i and node j with head k.

In certain embodiments, the computer executable code is further configured to, when the aspect term comprises multiple words or subwords, average extracted hidden representations of the at words or subwords to obtain the hidden representation of the aspect term.

In certain embodiments, the computer executable code is configured to classify the aspect term using a two layer multilayer perceptron (MLP).

In certain embodiments, the classifications comprise a positive sentiment, a neutral sentiment, and negative sentiment.

In certain embodiments, when the aspect term-sentence pair is used for prediction and there is no label for the aspect term-sentence pair, the computer executable code is further configured to: add the predicted classification label to the aspect term-sentence pair, and store the aspect term-sentence pair with the predicted classification label to a database. In certain embodiments, the database is a product comments database. In certain embodiments, a user can search the database to obtain the classification label of the aspect term-sentence pair, and use the obtained classification label to aid his product purchasing process. In certain embodiments, the user may use the aspect term to query the database In certain aspects, the present disclosure relates to a method. In certain embodiments, the method includes:

receiving, by a computing device, an aspect term-sentence pair, the aspect term-sentence pair comprising an aspect term and a sentence, and the sentence comprising the aspect term;

embedding, by the computing device, the aspect term-sentence pair to obtain embedding of each word in the sentence;

parsing, by the computing device, the sentence using a plurality of parsers to obtain a plurality of dependency trees;

performing edge union, by the computing device, on the plurality of dependency trees to obtain a merged graph, each node and each edge in the plurality of dependency trees included in the merged graph;

representing, by the computing device, each node in the merged graph by corresponding one of the embeddings of the words to obtain a relation graph;

performing a relation neural network, by the computing device, on the relation graph to obtain updated relation neural network;

extracting, by the computing device, hidden representation of the aspect term from the updated relation neural network to obtain extracted representation of the aspect term; and classifying, by the computing device, the aspect term based on the extracted representation to obtain a predicted classification label of the aspect term.

In certain embodiments, when the aspect term-sentence pair is a training aspect term-sentence pair and the aspect term has a classification label in regard to the sentence: the method further includes: receiving the classification label of the aspect term; calculating, by the computing device, a loss function based on the predicted classification label of the aspect term and the classification label of the aspect term; and adjusting, by the computing device, parameters of models in the computer executable code based on the loss function.

In certain embodiments, the method further includes adding a position dimension to the embedding of each of the words.

In certain embodiments, the number of the plurality of parsers is three, and the three parsers are CoreNLP, Stanza, and Berkeley neural parser.

In certain embodiments, the method further includes adding a child-to-parent relation to each parent-to-child relation to the merged graph, and adding a self-loop to each node in the merged graph, so as to obtain the relation graph.

In certain embodiments, the relation neural network is a relational graph attention network (RGAT).

In certain embodiments, the classifications comprise a positive sentiment, a neutral sentiment, and negative sentiment.

In certain embodiments, the method further includes adding the predicted classification label to the:

In certain embodiments, when the aspect term-sentence pair is used for prediction and there is no label for the aspect term-sentence pair, the method further includes: adding the predicted classification label to the aspect term-sentence pair, and storing the aspect term-sentence pair with the predicted classification label to a database. In certain embodiments, the database is a product comments database. In certain embodiments, a user can search the database to obtain the classification label of the aspect term-sentence pair, and use the obtained classification label to aid his product purchasing process. In certain embodiments, the user may use the aspect term to query the database In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 6, Table 1 shows datasets for comparing classification models according to certain embodiments of the present disclosure.

FIG. 7, Table 2 shows comparison of a GraphMerge model according to certain embodiments of the present disclosure with related models.

FIG. 8, Table 3 shows comparison of the GraphMerge model according to certain embodiments of the present disclosure with related baselines.

FIG. 9, Table 4 shows ablation study of the GraphMerge model according to certain embodiments of the present disclosure.

FIG. 10, Table 5 shows study of the GraphMerge model on different datasets according to certain embodiments of the present disclosure.

Figure 12A:
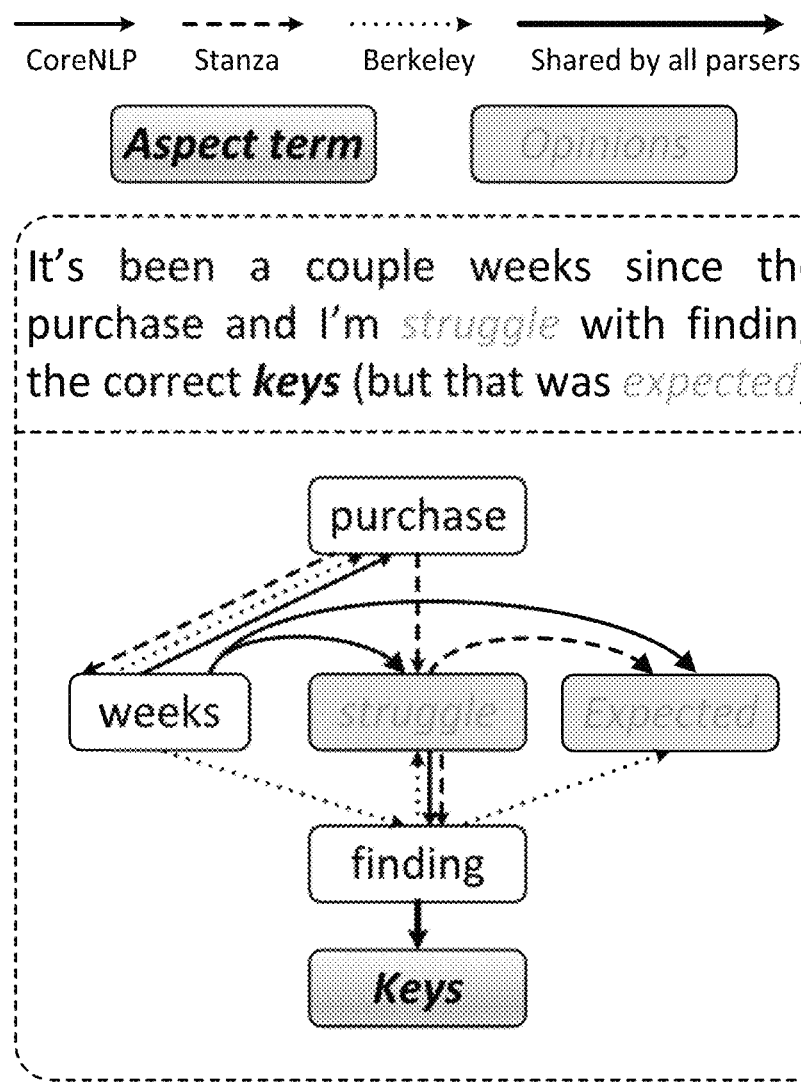
Figure 12B:
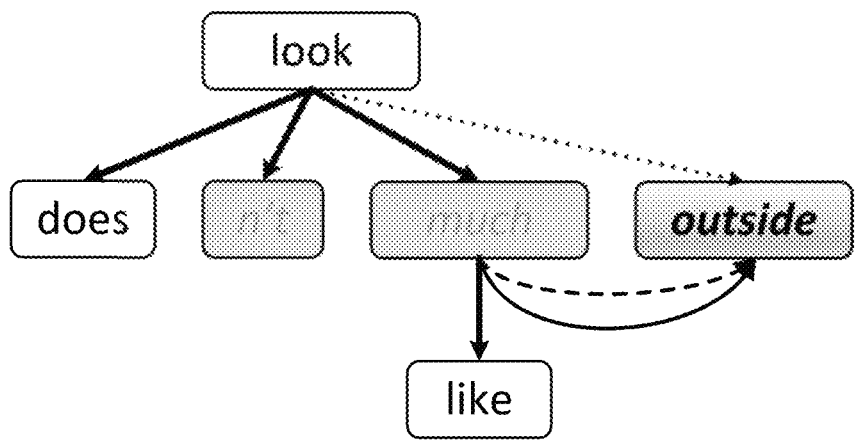
Figure 12C:
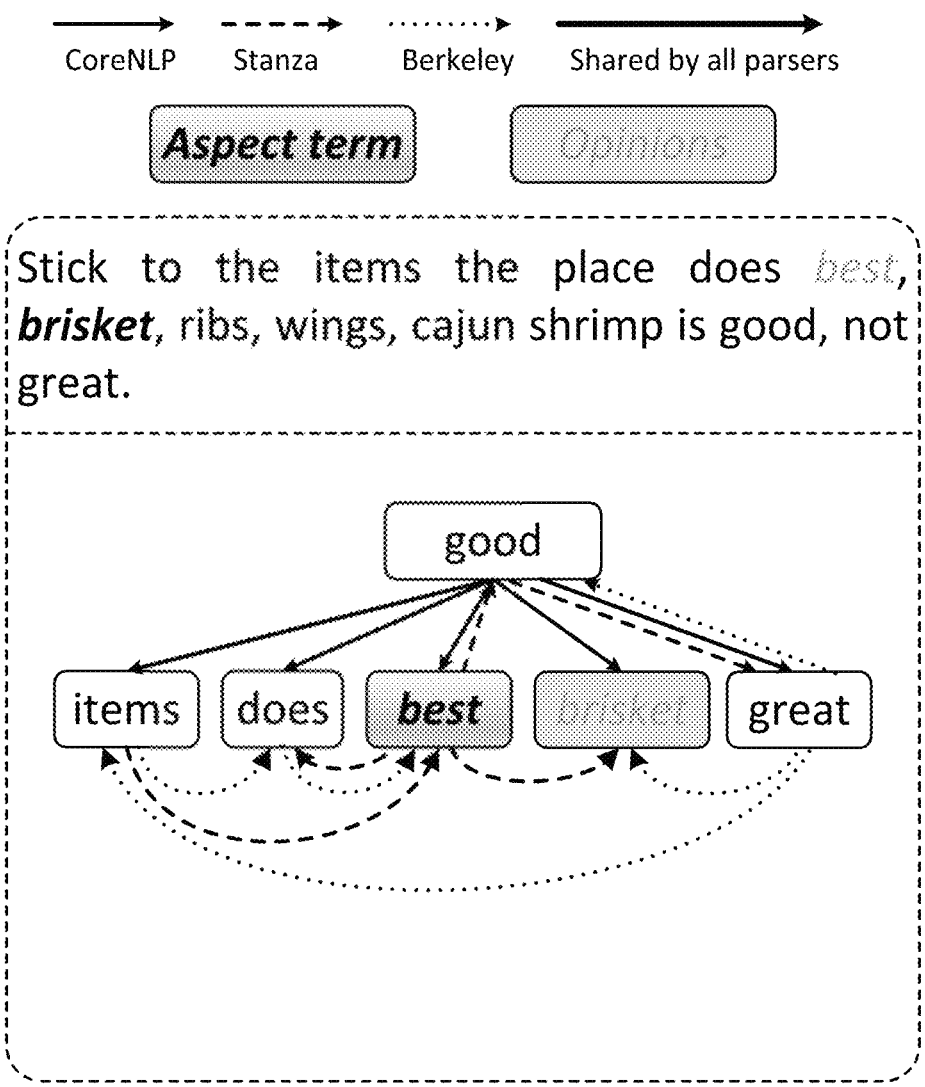

Each of FIGS. 12A-12C shows an example of partial dependency trees on which the single dependency tree models make wrong prediction, but the GraphMerge model of the present disclosure makes correct prediction.

FIG. 13, Table 6 shows datasets for robustness testing of the GraphMerge model according to certain embodiments of the present disclosure.

FIG. 14, Table 7 shows comparison of the GraphMerge model according to certain embodiments of the present disclosure to the single dependency tree based models and BERT model in terms of Aspect Robustness Score (ARS).

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
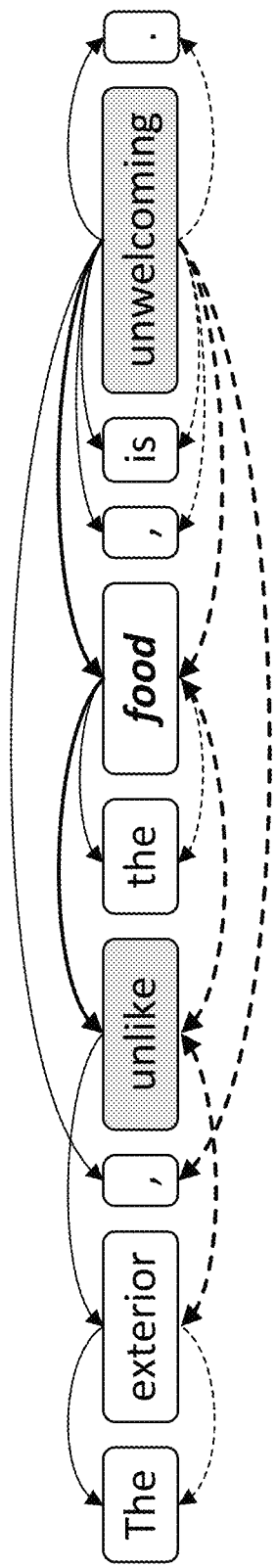
FIG. 1 schematically depicts an example where an incorrect parse can mislead aspect-level sentiment classification.
Figure 2:
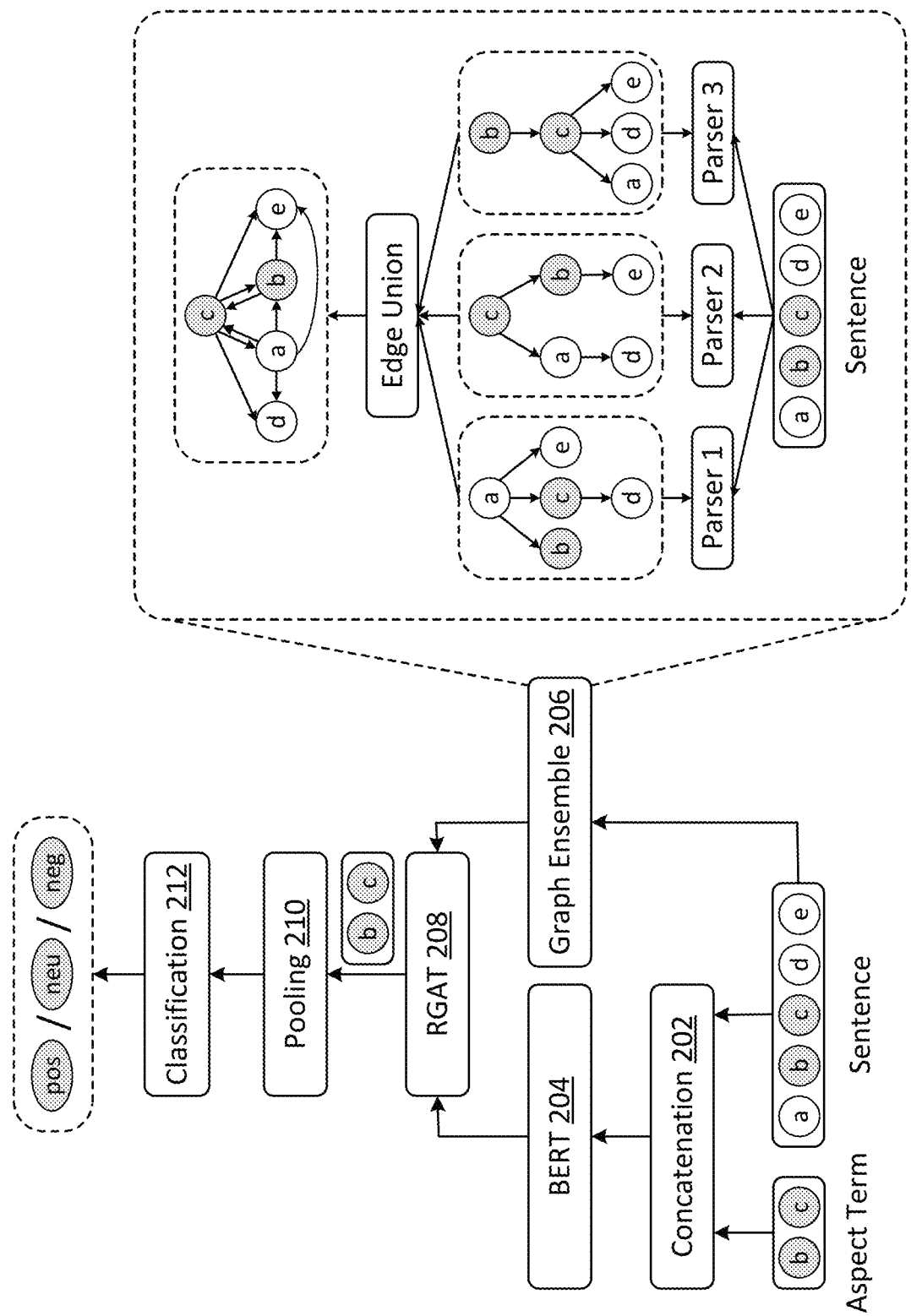
FIG. 2 schematically depicts an overall architecture for sentiment classification according to certain embodiments of the present disclosure.

In certain aspects, the present disclosure provides a framework of a GraphMerge model for aspect-level sentiment classification over multiple dependency trees. FIG. 2 schematically depicts an overall architecture for sentiment classification according to certain embodiments of the present disclosure, where multiple graphs of dependency trees are merged (GraphMerge) to form a graph ensemble. As shown in FIG. 2, for a training input of a term-sentence pair, the sentence includes words a, b, c, d, and e. All the words in the sentence except for the aspect term are considered as context words. The aspect term includes words b and c, and the context words are a, d, and e. The aspect term and the sentence are concatenated to form the concatenation 202, and the concatenation 202 is embedded using bidirectional Encoder Representations from Transformers (BERT) 204 to obtain encoding of the aspect terms and the sentence. In certain embodiments, the embeddings of the sentence words are used for the next step. At the same time, the sentence are parsed using different parsers 1, 2, and 3, and the parsing result by the three parsers are combined by edge union to form a merged graph. The number of parsers is not limited, which could be two or more than two. In certain embodiments, the merged graph only includes parent-to-child relations of the nodes by removing any other specific relations defined in the parsers. In other words, the merged graph includes nodes, and parent-to-child edges between certain nodes. The merged graph is further processed, for example, by adding a child-to-parent edge for each parent-to-child edge, and adding a self-loop for each node. The processed merged graph is also called a relation graph. The relation graph is defined as the graph ensemble 206. The encoding from the BERT 204 and the graph ensemble 206 are inputted into a relational neural network, such as relational graph attention networks (RGAT) 208. The disclosure then extracts hidden representations from nodes that corresponds to the aspect term words b and c, conduct pooling 210 such as average poling to obtain representation of the aspect term, and the classification 212 classifies the aspect term to one of multiple categories. The categories may include positive, neutral, and negative opinions.

Figure 3:
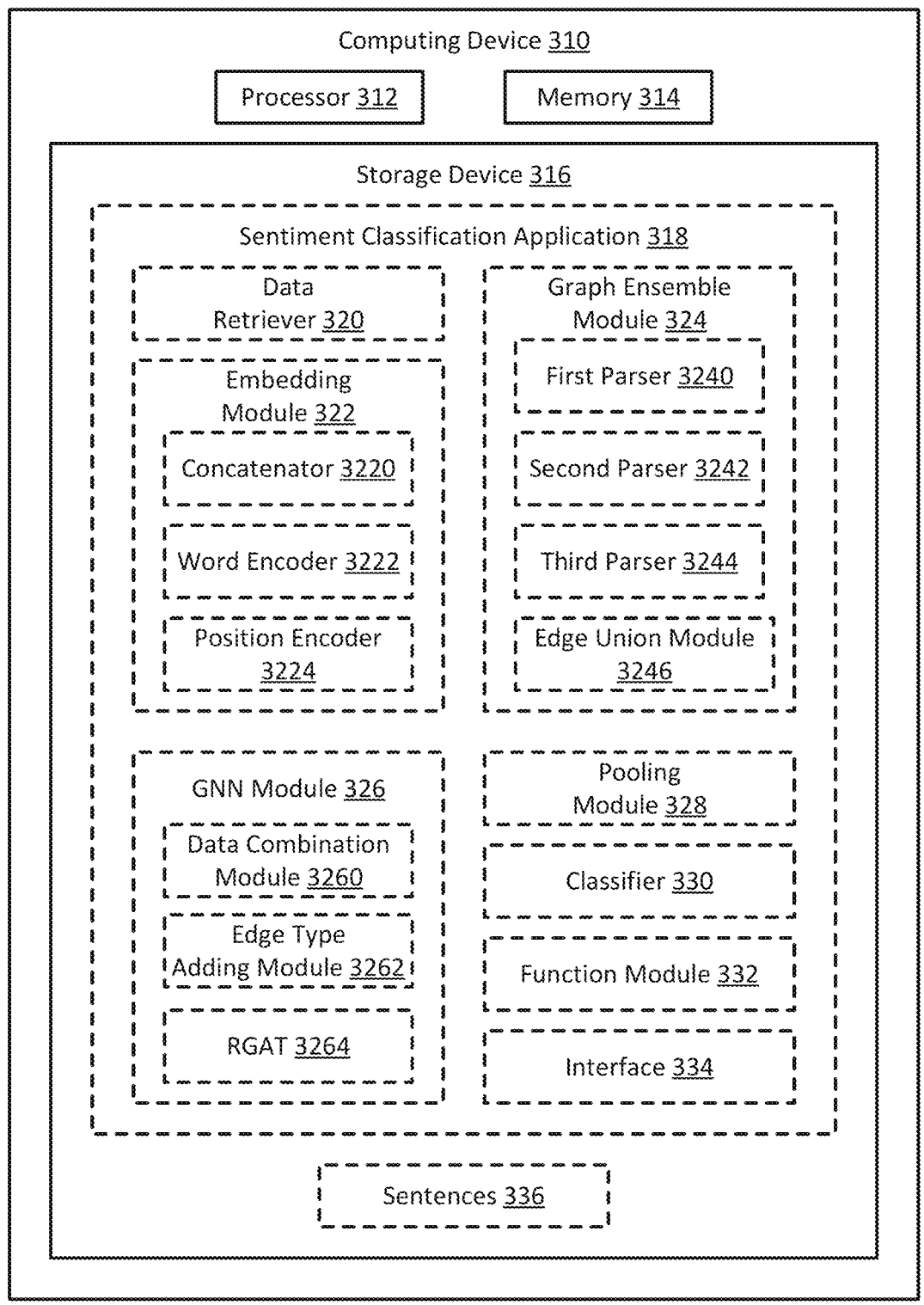
FIG. 3 schematically depicts an aspect-level sentiment classification system according to certain embodiments of the present disclosure.

FIG. 3 schematically depicts an aspect-level sentiment classification system according to certain embodiments of the present disclosure, where the sentiment classification application 318 has a framework corresponding to the framework shown in FIG. 2. As shown in FIG. 3, the system 300 includes a computing device 310. In certain embodiments, the computing device 310 may be a server computer, a cluster, a cloud computer, a general-purpose computer, a headless computer, or a specialized computer, which provides note classification or knowledge graph completion services. The computing device 310 may include, without being limited to, a processor 312, a memory 314, and a storage device 316. In certain embodiments, the computing device 310 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 312 may be a central processing unit (CPU) which is configured to control operation of the computing device 310. The processor 312 can execute an operating system (OS) or other applications of the computing device 310. In certain embodiments, the computing device 310 may have more than one CPU as the processor, such as two CPUs, four CPUs, eight CPUs, or any suitable number of CPUs. The memory 314 can be a volatile memory, such as the random-access memory (RAM), for storing the data and information during the operation of the computing device 310. In certain embodiments, the memory 314 may be a volatile memory array. In certain embodiments, the computing device 310 may run on more than one memory 314. The storage device 316 is a non-volatile data storage media for storing the OS (not shown) and other applications of the computing device 310. Examples of the storage device 316 may include non-volatile memory such as flash memory, memory cards, USB drives, hard drives, floppy disks, optical drives, solid-state drive, or any other types of data storage devices. In certain embodiments, the computing device 310 may have multiple storage devices 316, which may be identical storage devices or different types of storage devices, and the applications of the computing device 310 may be stored in one or more of the storage devices 316 of the computing device 310.

In this embodiment, the processor 312, the memory 314, and the storage device 316 are component of the computing device 310, such as a server computing device. In other embodiments, the computing device 310 may be a distributed computing device and the processor 312, the memory 314, and the storage device 316 are shared resources from multiple computing devices in a pre-defined area.

The storage device 316 includes, among other things, the sentiment classification application 318 and sentences 336. The sentiment classification application 318 is configured to train its model structure using aspect-level sentiment labels of the sentences 336, and make predictions for the sentences that do not have aspect-level sentiment labels. The sentences 336 are optional for the computing device 310, as long as the sentences stored in other devices are accessible to the sentiment classification application 318. In certain embodiments, the sentences 336 includes opinions from an ecommerce platform, and the opinions may be comments on products. In training stage, an aspect term-sentence pair in the sentences 336 may have a sentiment label so that it can be used to train the sentiment classification application 318; and in testing stage, an aspect term-sentence pair in the sentences 336 may have no sentiment label and there is a need for the classification application 318 to predict a sentiment label to the aspect term-sentence pair.

As shown in FIG. 3, the sentiment classification application 318 includes a data retriever 320, an embedding module 322, a graph ensemble module 324, a graph neural network (GNN) module 326, a pooling module 328, a classifier 330, a function module 332, and an interface 334. In certain embodiments, the sentiment classification application 318 may include other applications or modules necessary for the operation of the sentiment classification application 318. It should be noted that the modules 320-334 are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained using training data, and after well trained, can be used to make a prediction.

The data retriever 320 is configured to retrieve a sentence and an aspect term of the sentence from the sentences 336, provide the sentence and the aspect term to the embedding module 322, and provide the sentence to the graph ensemble module 324. In certain embodiments, the aspect term include one or more words in the sentence. In certain embodiments, during training of the sentiment classification application 318, the data retriever 320 is further configured to retrieve a sentiment label of the aspect term in the sentence, and provide the sentiment label to the classifier 330. In certain embodiments, the sentence has n words $\{w_1, w_2, \ldots, w_n\}$. Further, the sentence has t aspect term words, and the aspect term words are selected from the n words.

Here, n and t are positive integers, and n is greater than or equals to t. In certain embodiments, n is in a range of 2-200, and t is in a range of 1-10. In certain embodiments, n is in a range of 5-30, and t is in a range of 1-3. In certain embodiments, one aspect term may have one or two words, and one aspect term word may correspond to one or multiple tokens. In certain embodiments, when one sentence has several aspect terms, and each aspect term has a corresponding sentiment label, the data can be divided into several independent sentence-aspect term pairs, each pair includes the sentence and one of the aspect terms.

The embedding module 322 is configured to embed one or more aspect term words and the sentence containing the aspect term words to obtain an aspect term-sentence embedding, and send the embedding to the GNN module 326. The embedding module 322 includes a concatenator 3220, a word encoder 3222, and a position encoder 3224. The data retriever 320 is configured to provide the aspect term and the sentence to the concatenator 3202, and provide the sentence to the position encoder 3224.

The concatenator 3220 is configured to, upon receiving the sentence and the aspect term of the sentence, format the sentence and the aspect term words to obtain formatted aspect term-sentence, and feed the formatted aspect term-sentence to the word encoder 3204. In certain embodiment, the formatted aspect term-sentence is in the form of "[CLS]+Sentence+[SEP]+Term+[SEP]," where [CLS] is the class token placed at the beginning of the input sample, [SEP] is a separator, "Sentence" is the tokens of the sentence, and "Term" is the token of the aspect term from the "sentence." In certain embodiments, because the disclosure concatenates aspect term and sentence together to learn aspect-centric representation, the embedding can pick up contextual information efficiently.

The word encoder 3222 is configured to, upon receiving the formatted aspect term-sentence, encode the words in the formatted aspect term-sentence, and provide the encoded word representation to the position encoder 3224. In certain embodiments, the word encoder 3222 is a pre-trained BERT encoder. Because the formatted aspect term-sentence contains the separated aspect term, the BERT encoder can learn term-centric representations from the sentence during fine-tuning. In certain embodiments, to feed the resulting word-piece-based representations into word-based RGAT model, the BERT encoder is further configured to average pool representations of subwords (or tokens) for each word to obtain the encoded word representation. In certain embodiments, the word encoder 3204 can be one of various types of BERT, such as RoBERTa or DistilBERT. In certain embodiments, the word encoder 3204 can also be other type of word encoders, such as LSTM (Long Short Term Memory) based ELMo (Embedding from Language Models).

The position encoder 3224 is configured to, upon receiving the sentence from the data retriever 320 and receiving the encoded word representation from the word encoder 3222, define position information of the words from the sentence, add each word position to corresponding one of the encoded word representations to obtain final word representations X, and send the final word representation X to the GNN module 326. Kindly note that position information is beneficial for the task of the present disclosure, especially when there are multiple aspect terms in one sentence, where it helps to locate opinion words relevant to an aspect term. Although the BERT encoder already takes the word position into consideration, it is dampened after layers of transformers. Therefore, the present disclosure uses the position encoder 3224 to explicitly encode the absolute position for each word and add it to the BERT output. Specifically, the position encoder 3224 is configured to add a trainable position embedding matrix to the encoded word representation to obtain the final word representations X, and feed the final word representations X to the RGAT module 326.

The graph ensemble module 324 is configured to, upon receiving the sentence from the data retriever 320, parse the sentence using different parsers to obtain different parsing results (graphs), perform edge union on the different graphs to obtain a merged graph (or an ensembled graph), and send the merged graph to the GNN module 326. The graph ensemble module 324 includes a first parser 3240, a second parser 3242, a third parser 3244, and an edge union module 3246. The number M of the parsers 3240-3244 may vary, for example, in a range of 2-10. In certain embodiments, M is 2 or 3. In certain embodiments, the graph ensemble module 324 is configured to tokenize the sentence before performing parses, and the tokenization may be performed by, for example, Stanford CoreNLP (Christopher Manning, et al., The Stanford CoreNLP natural language processing toolkit, 2014, Proceedings of 52nd Annual Meeting of the Association for Computational Linguistics: System Demonstrations, 55-60). In certain embodiments, the first parser 3240, the second parser 3242, and the third parser 3244 are dependency based, and are CoreNLP, Stanza (Peng Qi, et al., Stanza: A Python natural language processing toolkit for many human languages, 2020, Proceedings of the 58th Annual Meeting of the Association for Computational Linguistics: System Demonstrations, 101-108), and Berkeley neural parser (Nikita Kitaev and Dan Klein, Constituency parsing with a self-attentive encoder, 2018, Proceedings of the 56th Annual Meeting of the Association for Computational Linguistics, v1:2676-2686). In certain embodiments, since the Berkeley parser returns constituency parses, the disclosure further converts the constituency parses into dependency parses using CoreNLP. Each parse generated by one of the parsers includes nodes and edges between some of the nodes, and the nodes and edges form a graph. After obtaining the parses or the graphs from the sentence using different parsers, the first, second, and third parsers 3240, 3242, and 3244 are further configured to provide the graphs to the edge union module 3246.

The edge union module 3246 is configured to, upon receiving the three different graphs, perform graph union on the graphs to obtain a merged graph, and send the merged graph to the GNN module 326. Given the sentence $\{w_1, w_2, \ldots, w_n\}$ and M different dependency parses $G_1, \ldots, G_m, \ldots, G_M$, the edge union module 3246 takes the union of the edges from all parses, and construct a single graph G as follows:

$$G = (V, \{e | e = w_i, w_j\} \in \cup_{m=1}^{M} E_m\}) \quad (1)$$

In the equation (1), G is the merged graph, V is the shared set of nodes among all graphs, V includes node i and node j, e is the edge from the node i to the node j, $E_m$ (1≤m≤M) is the set of edges in $G_m$, and i, j, m, and M are positive integers. In certain embodiments, the nodes and the edges of the merged graph are represented by vectors.

As a result, G contains all of the (directed) edges from all dependency trees, on top of which the GNN module 326 can apply the same GNN models when a single dependency tree is used. Therefore, the graph ensemble module 324 introduces virtually no computational overhead to the existing GNN approaches, compared to traditional ensemble approaches where computational time and/or parameter count scale linearly in M. Note that the parsing time is not accounted for computational cost, because the dependency tree from three parsers could be obtained in parallel thus the running time is the same as the single parser.

What is more, the resulting graph G likely contains more edges from the gold parse which correctly captures the syntactic relation between words in the sentence, allowing the GNN to be robust to parse errors from any specific parser. Finally, since G contains more edges between words when parses differ than any single parse and reduces the diameter of the graph, it is also more likely that a shallower GNN model is enough to learn good representations, therefore avoiding over-parameterization and thus over-fitting from stacking more GNN layers.

Further, the different parsers may provide different types of relations to the nodes in the merged graph. To simplify the relations, the edge union module 3246 is configured to remove all the relation types between the nodes, and only keep the direction. Therefore, for the nodes i and j, the merged graph G only defines whether there is a relation from the node i to the node j, and if the relation exists, the merged graph G defines the edge from the node i to the node j as a parent-to-child relation. When there is a relation from the node i to the node j, and there is a relation from the node j to the node i, there are two corresponding parent-to-child edges.

As a result, the merged graph include edges, and there is only one relation between certain of the edges, that is, the parent-to-child relation, and all the other types of edge relations generated by the parsers are discarded.

The GNN module 326 is configured to, upon receiving the final word representations X from the position encoder 3224 and the merged graph from the edge union module 3246, combine the word representation and the merged graph to obtain a combined graph, adding edges to the combined graph to obtain a relation graph, and perform graph neural network on the relation graph to obtain representations of the words. In certain embodiments, the GNN module 326 includes a data combination module 3260, an edge type adding module 3262, and a relational graph attention network (RGAT) 3264. The data combination module 3260 is configured to, upon receiving the final word representations X from the position encoder 3224 and the merged graph from the edge union module 3246, using the final word representations X as the representations of the nodes in the merged graph, so as to obtain combined graph, and send the combined graph to the edge type adding module 3262. Thus, in the combined graph, both the nodes and the edges are represented by vectors, and the representations of the nodes come from the embedding module 322.

The edge type adding module 3262 is configured to, upon receiving the combined graph, add child-to-parent type relations and self-loop type relations to the edges in the combined graph to form the relation graph, and send the relation graph to the RGAT 3264. As described above, the parsers may provide different types of relations, however, only the parent-to-child relations are kept in the merged graph. For each parent-to-child relation or each parent-to-child edge, the edge type addition module 3262 is configured to add a reciprocal child-to-parent edge. For example, for a parent-to-child relation from the nodes i to the node j (the node i is the parent node, and the node j is the child node), there is also added a child-to-parent relation from the node j to the node i (the node j is the child node, and the node i is the parent node). The adding of the child-to-parent relation allows the GNN module 326 to retain the original syntactic relation between words in the sentence. Further, the edge type adding module 3262 is configured to add a self-loop for each node in the combined graph. As a result, the obtained relation graph includes three types of relations: parent-to-child, child-to-parent, and self-loop. In certain embodiments, the edge type adding module 3262 may also be a part of the graph ensemble module 324, and the graph ensemble module 324 adds the child-to-parent relation and self-loop to the merged graph before sending the merged graph to the GNN module 326.

The RGAT 3264 is configured to, upon receiving the relation graph from the edge type addition module 3262, perform graph neural network on the relation graph. In certain embodiments, the graph neural network is graph attention networks (GAT, Petar Velickovic, et al., Graph attention networks, 2017, arXiv:1710.10903). In certain embodiments, the graph neural network is relational GAT (RGAT, Dan Busbridge, Dane Sherburn, Pietro Cavallo, and Nils Y Hammerla, Relational graph attention networks. 2019, arXiv:1904.05811). In certain embodiments, the RGAT 3264 is an adapted RGAT, where the RGAT is adapted to capture edge type information. In certain embodiments, the RGAT 3264 encodes the edge type information when computing the attention score between two nodes. The RGAT 3264 assigns each edge type an embedding $e \in \mathbb{R}^{d_h}$, and incorporate it into attention score computation as follows:

$$\alpha_{ij} = \frac{\exp(\sigma(\alpha W(h_i \parallel h_j) + \alpha_e e_{ij}))}{\sum_{v \in N_i} \exp(\sigma(\alpha W(h_i \parallel h_j) + \alpha_e e_{ij}))}. \quad (2)$$

In the equation (2), $e_{ij}$ is the representation of the type of the edge connecting nodes i and j, $\alpha \in \mathbb{R}^{d_h}$, $W \in \mathbb{R}^{d_h \times 2d_h}$, $\alpha_e \in \mathbb{R}^{d_h}$ are learnable matrices, $\sigma$ denotes ReLU activation function, $\mathbb{R}$ is a real number, and $d_h$ is the number of dimensions of each head.

In certain embodiments, in one layer of the RGAT 3264, the hidden representation of each node in the graph is computed by attending over its neighbors, with a multi-head self-attention mechanism. The representation for word i at l-th layer of the RGAT 3264 can be obtained as follows:

$$h_i^{(l)} = \parallel_{k=1}^K \sigma(\Sigma_{j \in N_i} \alpha_{ij}^k W^k h_i^{(l-1,k)}) \quad (3).$$

In the equation (3), K is the number of attention heads, $N_i$ is the neighborhood of node i in the graph, and $\parallel$ the concatenation operation. $W^k \in \mathbb{R}^{d_B \times d_h}$ represents the learnable weights in the RGAT model, and $\sigma$ denotes ReLU activation function. $\alpha_{ij}^k$ is the attention score between node i and node j with head k.

After performing graph neural network, the parameters of the graph neural network RGAT 2364 are available to the pooling module 328.

The pooling module 328 is configured to, after performance of the RGAT 2364, extract hidden representations from nodes that correspond to words or subwords of the aspect term in the last RGAT layer, conduct average pooling on the extracted representations to obtain one pooled representation $h_t \in \mathbb{R}^{d_h}$, and feed the pooled representation $h_t$ of the aspect term to the classifier 330.

The classifier 330 is configured to, upon receiving the pooled representation, classify the pooled representation as one of the sentiments. In certain embodiments, the classifier 330 is a two-layer MLP. In certain embodiments, the classifier 330 is configured to calculate the final classification scores as follows:

$$\hat{y}_s = \text{softmax}(W_2 \text{ReLU}(W_1 h_t)) \quad (4).$$

In the equation (4), $W_2 \in \mathbb{R}^{C \times d_{out}}$ and $W_1 \in \mathbb{R}^{d_{out} \times d_h}$ denote learnable weight matrices, and C is the number of sentiment classes. In certain embodiments, C is 3, and the sentiment classes are positive, neutral, and negative.

During training, the true label of the sentence is provided to the classifier 330 by the data retriever 320, and the sentiment classification application 318 is configured to optimize the model to minimize the standard cross entropy loss function, and apply weight decay to model parameters. The models to be optimized may include, for example, the word encoder 3222, the RGAT 3264, and the classifier 330.

During prediction, there is no label for an aspect term-sentence pair, and the classifier 330 is configured to make a prediction of a sentiment for the aspect term in the sentence based on the classification score, and send the prediction to the function module 332. In certain embodiments, there is no need to calculate the loss function and adjust parameters during prediction.

The function module 332 is configured to, when the classification of an aspect term is determined for an aspect term-sentence pair, add the classification label of the aspect term to the aspect term-sentence pair. When a large number of aspect term-pairs are labeled, the function module 332 is further configured to present the labeled opinions to the customers, for example in a form of a searchable database. The customer may search an aspect term in a product or a category of product, and the database returns number of sentiments for that aspect term, such as 100 positive, 10 neutral, and 5 negative from 115 comments on the aspect term feature of the product. In certain embodiments, the function module 332 may recommend a product to the customer when the customer is searching a product using an aspect term, and the aspect term of a product is mostly positive or the product has a percentage of positive reviews higher than the other products in the same category of products.

In an example, opinions or comments from customers on products are available, and aspect terms of the products are predefined. The predefined terms may by rule-based. For example, "quality" and "price" may be defined as rules, and the application may find the "quality" and "price" terms in an opinion and define them as aspect terms of the opinion. After receiving the opinions with labeled aspect terms, the sentiment classification application 318 is configured to classify the aspect terms into positive, negative, or neutral, and present the results to customers. When an opinion on a product include two aspect terms, one aspect term such as "quality" may be positive (high quality), and the other aspect term "price" may be negative (expensive). When a new customer review the opinion and she cares more about the "quality" aspect, she may choose to buy the product because the classification of the "quality" is positive; if she cares more about the "price" aspect, she may choose not to buy the product because the classification of the "price" is negative. By providing the opinions based on their aspect terms, the sentiment classification application 318 provides a fine-grained result for the customers to make decisions.

In certain embodiments, the function module 332 is configured to perform the above function automatically or in a predefined time interval, or when trigged by an update of the sentences 336. For example, after the update of the sentences 336, the function module 332 would look for more linked relations between products and customers, and the function module 332 would subsequently push the products to the corresponding customers when the updated relations between the customers and the products are interested in.

The interface 334 is configured to provide a user interface for an administrator of the sentiment classification application 318 to train the word encoder 3222, the RGAT 3264, and the classifier 330, optionally the first, second and third parsers 3240, 3242, and 3244, and optionally the function module 330, and adjust model parameters; or is configured to provide a user interface for the administrator to use the sentiment classification application 318 to obtain and use the sentences 336 for certain functions.

The sentences 336 may include datasets for training the sentiment classification application 318 or for make predictions by the sentiment classification application 318. In certain embodiments, the sentences 336 for training and prediction may be different but related datasets. For example, the training sentences may be customer opinions or comments in regard to an aspect term, with the sentiment label of the aspect term in the sentence; while the prediction sentences may be customer opinions or comments in regard to an aspect term, but there is no sentiment label for the aspect term in the prediction sentence.

Figure 4:
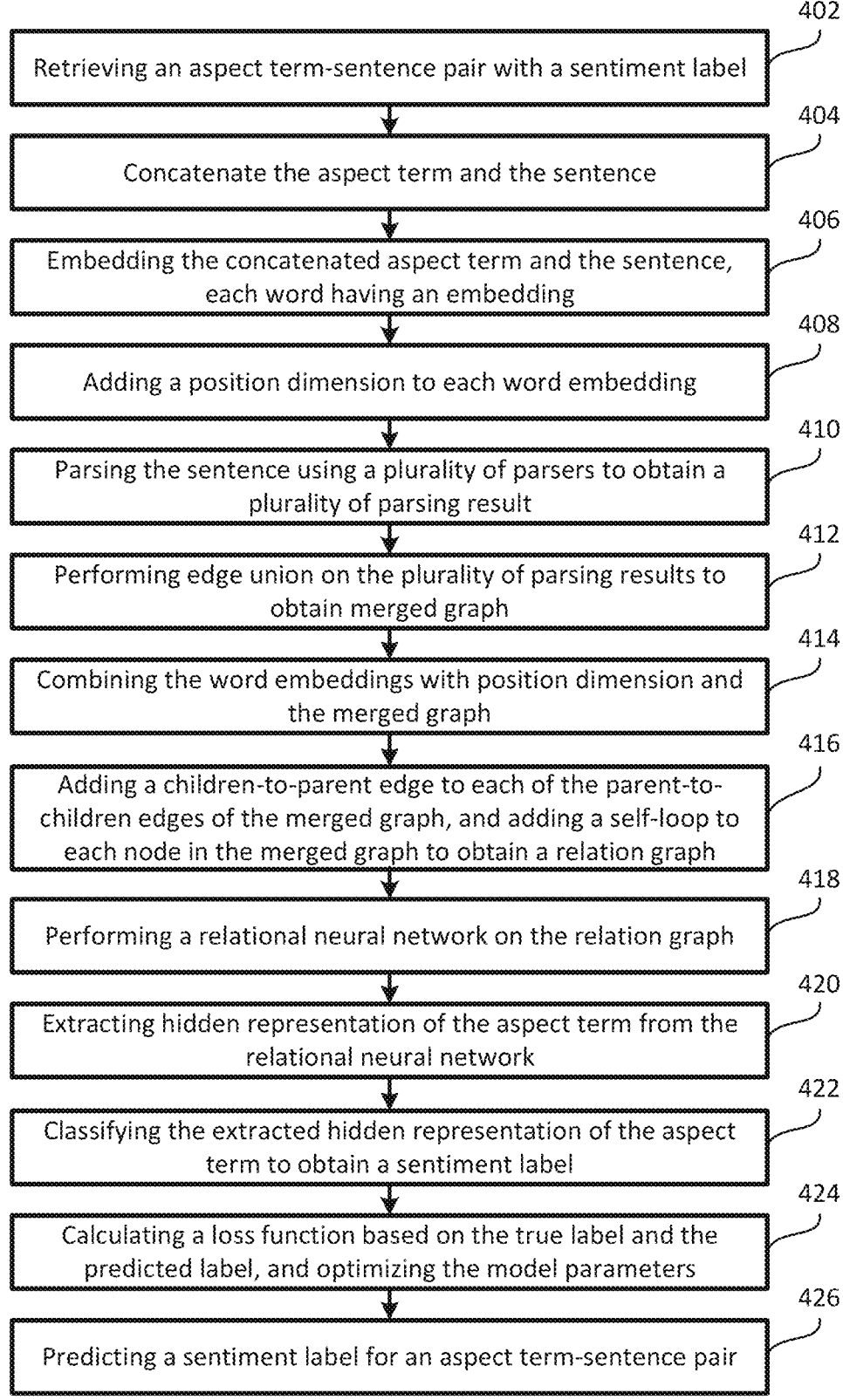
FIG. 4 schematically depicts a training process for a sentiment classification application according to certain embodiments of the present disclosure.

FIG. 4 schematically depicts a training process for a sentiment classification application according to certain embodiments of the present disclosure. In certain embodiments, the training process is implemented by the computing device 310 shown in FIG. 3. It should be particularly noted that, unless otherwise stated in the present disclosure, the steps of the training process or method may be arranged in a different sequential order, and are thus not limited to the sequential order as shown in FIG. 4.

As shown in FIG. 4, at procedure 402, the data retriever 320 retrieves an aspect term-sentence pair with a sentiment label, provides the aspect-term sentence pair to the concatenator 3220, provides the sentence to the first, second, and third parsers 3240, 3242, and 3244, and provides the label of the pair to the classifier 330.

At procedure 404, the concatenator 3220 concatenates the aspect term and the sentence to obtain the concatenation, and sends the concatenation to the word encoder 3222. The concatenation may be in the form of "[CLS]+Sentence+[SEP]+Term+[SEP]."

At procedure 406, upon receiving the concatenation, the word encoder 3222 encodes the concatenation to obtain embedding of each word in the sentence, and sends the embeddings to the position encoder 3224. In certain embodiments, the word encoder 3222 is BERT. When an aspect term word or a context word has multiple embedding tokens, the embedding tokens are averaged, such that each embedding corresponds to one word in the sentence. In certain embodiments, punctuation in the sentence also has a corresponding embedding.

At procedure 408, upon receiving the word embeddings, the position encoder 3224 adds a position embedding representing position of each word in the sentence to the embedding of each word representation to obtain the final word representations X, and sends the final word representations X to the data combination module 3260. In certain embodiments, the representation for each word is a vector. The vector for the word have multiple dimensions. In addition to the dimensions obtained by the word encoder 3222, the vector for each word also include a dimension corresponding to the position of the word in the sentence.

At procedure 410, upon receiving the sentence from the data retriever 320, the first, second and third parsers 3240, 3242, and 3244 parse the sentence, respectively, to obtain three dependency trees, and send the three dependency trees to the edge union module 3246. In certain embodiments, the sentence is first tokenized before being parsed by the parsers. In certain embodiments, the tokenization is performed by CoreNLP. In certain embodiments, the three parsers are CoreNLP, Stanza, and Berkely neural parser. In certain embodiments, the constituency parsing result by the Berkeley neural parser is further processed using CoreNLP to convert the constituency parsing result to the dependency parsing result. In certain embodiments, each word and optionally the punctuation is a unit or a node in the dependency tree. In certain embodiments, the number and the types of the parsers may vary.

At procedure 412, upon receiving the three dependency trees, the edge union module 3246 performs edge union on the three dependency trees to obtain the merged graph, and sends the merged graph to the data combination module 3260. The merged graph includes all the nodes from the three dependency trees, and all the edges from the three dependency trees.

At procedure 414, upon receiving the word embeddings and the merged graph, the data combination module 3260 combines the word embeddings and the merged graph, and sends the combination to the edge type adding module 3262. In certain embodiments, the combination is performed by representing the nodes in the merged graph by the corresponding word embeddings. In certain embodiments, the nodes of the dependency tree graph correspond to the words in the sentence, that is, the number of nodes in the dependency tree graph is equal to the number of words in the sentence. In certain embodiments, when two words are linked in the dependency tree, the dependency tree graph will define it as an edge. In certain embodiments, the nodes in the dependency graphs are the same as the nodes in the merged graph. In certain embodiments, each node in the merged graph is represented by the embedding of the corresponding word.

At procedure 416, upon receiving the combination, the edge type adding module 3262 adds a child-to-parent edge to each of the parent-to-child edges, adds a self-loop to each of the nodes, so as to obtain the relation graph, and sends the relation graph to the RGAT 3264.

At procedure 418, upon receiving the relation graph, the RGAT 3264 performs relation neural network using the relation graph, so as to update the node embeddings of the RGAT model.

At procedure 420, the pooling module 328 extracts hidden representations of the aspect term, averages the hidden representations, and sends the averaged representation to the classifier 330.

At procedure 422, upon receiving the averaged representation, the classifier 330 calculates the final classification score for the averaged representation, and predicts the classification based on the classification score.

At procedure 424, the classifier 330 calculates a loss function based on the classification score and the ground true label received from the data retriever 320, and optimizes the model parameters of the word encoder 3222, the RGAT 3264, and the classifier 330.

In certain embodiments, the procedures 402-424 are performed iteratively using multiple training aspect term-sentence pairs, until the training is repeated for a predetermined number of times, or until the model parameters converge. Each aspect term-sentence pair may be used once or multiple times in the training.

In certain embodiments, after well-training of the sentiment classification application 318, the method may further include a procedure 426 for predicting a sentiment for an aspect term-sentence pair. The predictions are performed using the steps similar to the procedures 402-424. The difference is that the aspect term-sentence pair does not has a label, and there is no need to calculate the loss function to further optimize the model parameters.

Figure 5:
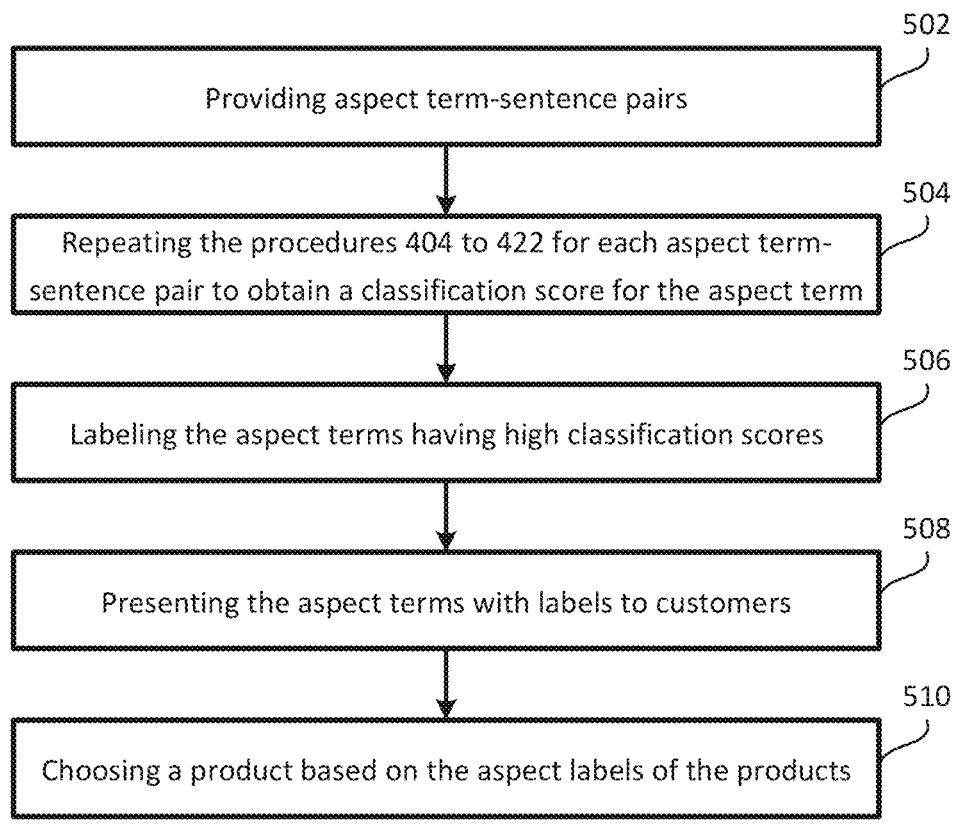
FIG. 5 schematically depicts a method for aspect level sentiment classification according to certain embodiments of the present disclosure.

FIG. 5 schematically depicts a method 500 for an aspect-term classification according to certain embodiments of the present disclosure, after the sentiment classification application 318 is well-trained. In certain embodiments, the method is implemented by the computing device 310 shown in FIG. 3, specifically the function module 332. It should be particularly noted that, unless otherwise stated in the present disclosure, the steps of the prediction process or method may be arranged in a different sequential order, and are thus not limited to the sequential order as shown in FIG. 5.

As shown in FIG. 5, at procedure 502, the function module 330 provides one or more aspect term-sentence pairs. The sentences in the term-sentence pairs may be customer comments on an ecommerce platform, and the aspect terms may be extracted from the customer comments using a rule, such as defining price and quality of the products as the aspect terms.

At procedure 504, for each aspect term-sentence pair, the function module 332 calls the embedding module 322, the graph ensemble module 324, the GNN module 326, the pooling module 328, and the classifier 330 to perform the procedures 404-422, so as to obtain the classification score of the aspect term in the corresponding sentence. There are a large number of aspect term-sentence pairs, and there are a large number of corresponding classification scores.

At procedure 506, the function module 332 ranks the classification scores, and labels the aspect terms that have the high classification scores. For example, the function module 332 may label the aspect terms whose classification scores are at a predetermined percentage of the rank, such as top 10% of the rank, or top 20% of the rank. In another example, the function module 332 may set a threshold classification score, and when an aspect term has a classification score that is greater than the threshold classification score, the classification is regarded as true and the function module 332 labels the aspect term with its predicted classification.

At procedure 508, the function module 332 adds the aspect term labels, the sentences, and the related products as a knowledge graph or database, and presents the knowledge graph or database to the customers.

At procedure 510, when the customers search or review the products, he can choose the product based on the product's aspect term labels, and the function module 332 may, upon receiving an instruction from a customer that she is interested, help the customer to place an order of the product.

In a further aspect, the present disclosure is related to a non-transitory computer readable medium storing computer executable code. The code, when executed at a processer 312 of the computing device 310, may perform the methods as described above. In certain embodiments, the non-transitory computer readable medium may include, but not limited to, any physical or virtual storage media. In certain embodiments, the non-transitory computer readable medium may be implemented as the storage device 316 of the computing device 310 as shown in FIG. 3.

Certain embodiments of the present disclosure, among other things, have the following beneficial advantages: (1) the disclosure provides a GraphMerge technique to combine dependency parsing trees from different parsers to improve model robustness to parsing errors. The ensemble graph enables the model to learn from noisy graph and select correct edges among nodes at no additional computational cost. (2) The disclosure retains the syntactic dependency information in the original trees by parameterizing parent-to-child and child-to-parent edges separately, which improves the performance of the RGAT model on the ensemble graph. (3) The disclosed GraphMerge RGAT model outperforms recent state-of-the-art work on three benchmark datasets (Laptop and Restaurant reviews from SemEval 2014 and the ACL 14 Twitter dataset). It also outperforms its single-parse counterparts as well as other ensemble techniques.

EXPERIMENTS

Experiments Setup

Data & Processing. We evaluate our model on three datasets: Restaurant and Laptop reviews from SemEval 2014 Task 4 (14Rest and 14Lap) and ACL 14 Twitter dataset (Twitter) (Li Dong, Furu Wei, Chuanqi Tan, Duyu Tang, Ming Zhou, and Ke Xu, Adaptive recursive neural network for target-dependent twitter sentiment classification, 2014, Proceedings of the 52nd Annual Meeting of the Association for Computational Linguistics, v2:49-54). We remove several examples with "conflict" sentiment polarity labels in the reviews. The statistics of these datasets are listed in FIG. 6, Table 1. Following previous work, we report the accuracy and macro F1 scores for sentiment classification. For dependency-based approaches, we tokenize sentences with Stanford CoreNLP, and then parse them with CoreNLP, Stanza, and the Berkeley neural parser. Since the Berkeley parser returns constituency parses, we further convert it into dependency parses using CoreNLP.

Baselines. We compare our GraphMerge model against published work on these benchmarks, including: BERT-SPC (Youwei Song, Jiahai Wang, Tao Jiang, Zhiyue Liu, and Yanghui Rao, Attentional encoder network for targeted sentiment classification, 2019, arXiv:1902.09314, hereinafter "Song2019") feeds the sentence and term pair into the BERT model and uses the BERT outputs for predictions; AEN-BERT (Song2019) uses BERT as the encoder and employs several attention layers. BERT+Dependency tree based models: DGEDT-BERT (Hao Tang, Donghong Ji, Chenliang Li, and Qiji Zhou, Dependency graph enhanced dual transformer structure for aspect-based sentiment classification, 2020, Proceedings of the 58th Annual Meeting of the Association for Computational Linguistics, 5679-5688) proposes a mutual biaffine module to jointly consider the representations learnt from Transformer and the GNN model over the dependency tree; R-GAT+BERT (Kai Wang, Weizhou Shen, Yunyi Yang, Xiaojun Quan, and Rui Wang, Relational graph attention network for aspect-based sentiment analysis, 2020, arXiv:2004.12362) reshapes and prunes the dependency tree to an aspect-oriented tree rooted at the aspect term, and then employs RGAT to encode the new tree for predictions. For fair comparison, we report the results of our GraphMerge model using the same data split (without a development set).

To understand the behavior of different models, we also implement several baseline models. In our experiments, we randomly sample 5% training data as held-out development set for hyper-parameter tuning, use the remaining 95% for training and present results of the average and standard deviation numbers from five runs of random initialization on the test set. We consider these baselines:

1. BERT-baseline which feeds the sentence-term pair into the BERT-base encoder and then applies a classifier with the representation of the aspect term token.

2. GAT-baseline with Stanza which employs a vanilla GAT model over single dependency tree obtained from Stanza without differentiating edge types. And the initial node features are the raw output of the BERT encoder.
3. RGAT over single dependency trees, where we apply RGAT models with parent-to-child and child-to-parent edge types over different dependency trees from the CoreNLP, Stanza, and Berkeley parsers. For a fair comparison to our GraphMerge model, the RGAT input comes from BERT encoder plus position embeddings.
4. Two ensemble models to take advantage of multiple dependency trees, including a Label-Ensemble model which takes the majority vote from three models each trained on one kind of parses, and a Feature Ensemble model which applies three sets of RGAT parameters, one for each parse, on top of the BERT encoder with their output features concatenated. These models have more parameters and are more computationally expensive compared to the GraphMerge model when operating on the same parses.

Parameter Setting. We use Pytorch (Adam Paszke, et al., Pytorch: An imperative style, high-performance deep learning library, 2019, Advances in Neural Information Processing Systems, 32:8024-8035) to implement our models. The GAT implementation is based on Deep Graph Library (Minjie Wang, et al., Deep graph library: Towards efficient and scalable deep learning on graphs, 2019, arXiv:1909.01315). During training, we set the learning rate=$10^{-5}$, batch size=4. We use dev data to select the hidden dimension $d_h$ for GAT/RGAT from $\{64, 128, 256\}$, the head number in the multi-head self-attention from $\{4, 8\}$, and GAT/RGAT layer from $\{2, 3, 4\}$. The 2-layer GAT/RGAT models turn out to be the best based on the dev set. We apply dropout (Nitish Srivastava et al., Dropout: a simple way to prevent neural networks from overfitting, 2014, JMLR, 15(1):1929-1958) and select the best setting from the dropout rate range=[0.1, 0.3]. We set the weight of L2 regularization as $10^{-6}$. We train the model up to 5 epochs.

Experimental Results:

We first compare our model to previous work following the evaluation protocol in previous work, and report results in FIG. 7, Table 2. As we can see, the GraphMerge model achieves best performances on all three datasets. On the Laptop dataset, the GraphMerge model further outperforms baselines by at least 1.42 accuracy and 2.34 Macro-F1 respectively.

FIG. 8, Table 3 shows performance comparisons of the GraphMerge model with other baselines in terms of accuracy and Macro-F1. We observe that:

Syntax information benefits aspect-level sentiment classification. All GAT and RGAT models based on dependency trees outperform BERT-baseline on all three datasets. This demonstrates that leveraging syntax structure information is beneficial to this task.

Ensemble models benefit from multiple parses. The Label-Ensemble, Feature-Ensemble, and GraphMerge models achieve better performance compared to their single dependency tree counterparts. This shows that ensemble models benefit from the presence of different parses and thus less sensitive to parse errors from any single parser.

GraphMerge achieves the best performance overall. Our proposed GraphMerge model not only shows consistent improvements over all single dependency tree models, but also surpasses the other two ensemble models without additional parameters or computational overhead, when compared to the single-tree models. Note that although in this specific task, the best results are achieved using three trees in GraphMerge. The number of trees for ensemble depends on different tasks and datasets.

Model Analysis:

We analyze the proposed GraphMerge model from two perspectives: an ablative analysis of model components and an analysis of the change in the dependency graphs after GraphMerge is applied.

1. Ablation Study.

Model components. We conduct ablation studies of our modeling for edge type and position information in FIG. 9, Table 4. We observe that: (1) On three datasets, ablating the edge type degrades the performances. It indicates that the syntactic dependency information in original dependency trees is important. Differentiating edges in the ensemble graph provides more guidance to the model about selecting useful connections among nodes. (2) Removing the position embeddings hurts the performances as well. Although the BERT encoder already incorporates position information at its input, this information is dampened over the layers of Transformers. Emphasizing sequence order again before applying RGAT benefits the task.

Edge Union vs. Edge Intersection. While GraphMerge keeps all edges from different dependency parsing trees for the RGAT model to learn to use, this could also result in too much structural noise and adversely impact performance. We therefore compare GraphMerge to edge intersection, which only retains edges that shared by all individual trees when constructing the ensemble graph, which can be thought of distilling syntactic information that an ensemble parser is confident about. We observe from the last row in Table 4 that edge intersection strategy underperforms GraphMerge on average accuracy and Marco-F1. We postulate that this is because edge intersection overprunes edges in the ensemble graph and might introduce more disjoint connected components where parsers disagree, which the RGAT model cannot easily recover from.

2. Graph Structure Analysis

Effect of GraphMerge on Graph Structure. To better understand the effect of GraphMerge on dependency graphs, we conduct statistical analysis on the test set of 14Lap and 14Rest. Specifically, we are interested in the change in the shortest distance between the aspect term and its opinion words on the dependency graphs. For this analysis, we use the test sets with opinion words labeled by Fan et al. (2019), where FIG. 10, Table 5 shows dataset statistics.

Figure 11A:
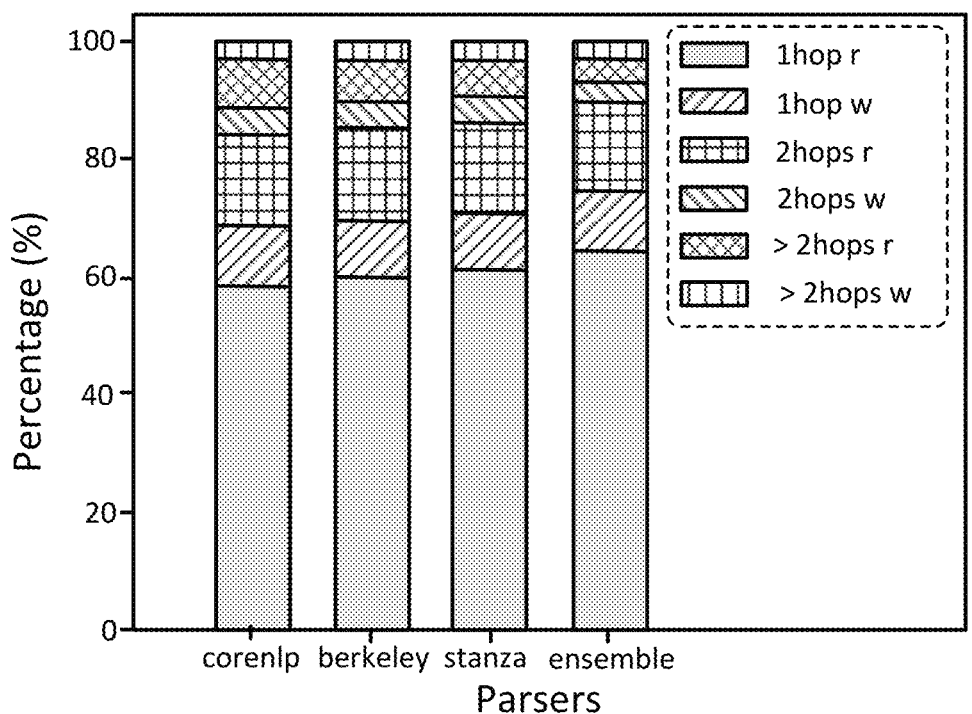
FIG. 11A shows accuracy of the GraphMerge model according to certain embodiments of the present disclosure with regard to different hop numbers on 14Lap dataset.
Figure 11B:
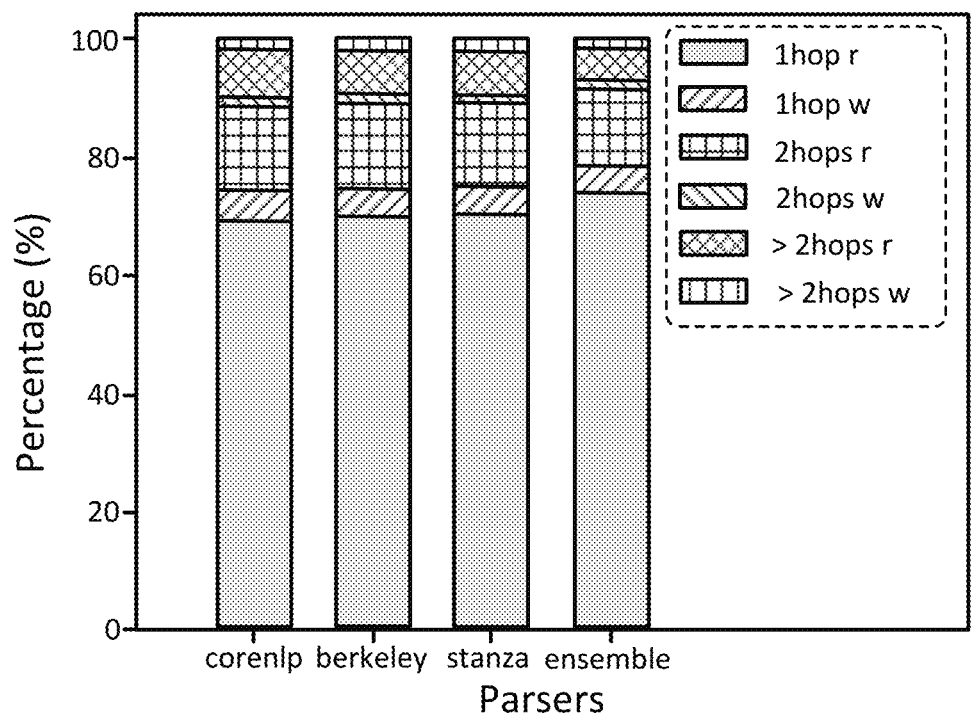
FIG. 11B shows accuracy of the GraphMerge model according to certain embodiments of the present disclosure with regard to different hop numbers on 14Rest dataset.

We summarize analysis results in FIG. 11A and FIG. 11B. We observe that: (1) Compared with single dependency tree, the ensemble graph effectively increases the number of one-hop and two-hops cases, meaning the overall distance between the term and opinion words is shortened on both datasets. (2) Shorter distance between the term and opinion words correlates with better performance. With the ensemble graph, the accuracy of one-hop and two-hops cases beats all single dependency tree models. These observations suggest that the ensemble graph from GraphMerge introduces important connectivity to help alleviate overparameterization from stacking RGAT layers, and that the RGAT model is able to make use of the diversity of edges in the resulting graph to improve classification performance.

Note that although shortening distance correlates with improved results, it does not mean that the closer distance is sufficient for better performance. This is because although the BERT model can be seen as a GAT over a fully-connected graph where a word is reachable for all other context words within one hop (Guangtao Wang et al., Direct multi-hop attention based graph neural network, 2020, arXiv:2009.14332), the BERT baseline model performs worse than dependency based models. Therefore, encoding the syntactic structure information in dependency trees is crucial for this task. Our GraphMerge model achieves the best results by shortening the graph distance between the aspect term and opinion words with syntactic information.

Case Study. To gain more insight into the GraphMerge model's behavior, we find several examples and visualize their dependency trees from three parsers, as shown in FIG. 12. Due to the space limit, we only show partial dependency trees that contain essential aspect terms and opinion words. These examples are selected from cases that all single dependency tree RGAT models predict incorrectly, but the GraphMerge model predicts correctly. We observe that in general, the three parsers do not agree in the neighborhood around the aspect term and opinion words in these sentences. As a result, GraphMerge tends to shorten the distance between the aspect term and the opinion words on the resulting graph. For instance, for all examples in FIGS. 12A, 12B and 12C, the shortest distances between the aspect term and the opinion words are no more than two in the ensemble graphs, while they vary from 2 to 4 in the original parse trees. This could allow the RGAT model to capture the relation between the words without an excessive number of layers, thus avoiding overfitting.

On the other hand, we observe that the resulting ensemble graph from GraphMerge is more likely to contain the gold parse for the words in question. For instance, in the first two examples, the gold parse for the words visualized in the figure can be found in the ensemble graph (despite no individual parser predicting it in the first example); the third example also has a higher recall of gold parse edges than each parser despite being difficult to parse. This offers the RGAT model with the correct semantic relationship between these words in more examples during training and evaluation, which is often not accessible with those single parse trees.

Aspect Robustness. To study the aspect robustness of the GraphMerge model, we test our model on the Aspect Robustness Test Set (ARTS) datasets proposed by Xing et al. (Xiaoyu Xing, et al, Tasty burgers, soggy fries: Probing aspect robustness in aspect based sentiment analysis, 2020, EMNLP, 3594-3605) (see FIG. 13, Table 6 for statistics). The datasets enrich the original 14Lap and 14Rest datasets following three strategies: reverse the sentiment of the aspect term; reverse the sentiment of the non-target terms with originally the same sentiment as target term; generate more non-target aspect terms that have opposite sentiment polarities to the target one. They propose a novel metric, Aspect Robustness Score (ARS), that counts the correct classification of the source example and all its variations generated by the above three strategies as one unit of correctness.

We compare three single dependency tree models with the GraphMerge model in FIG. 14, Table 7. We directly evaluate the models trained on the original SemEval datasets on ARTS without further tuning. The results indicate that the GraphMerge model shows better aspect robustness than single dependency tree and BERT models.

In summary, the present disclosure provides a simple yet effective graph-ensemble technique, GraphMerge, to combine multiple dependency trees for aspect-level sentiment analysis. By taking the union of edges from different parsers, GraphMerge allows graph neural model to be robust to parse errors without additional parameters or computational cost. With different edge types to capture the original syntactic dependency in parse trees, our model outperforms previous state-of-the-art models, single-parse models, as well as traditional ensemble models on three aspect-level sentiment classification benchmark datasets.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, the computing device comprising a processer and a storage device storing computer executable code, wherein the computer executable code, when executed at the processor, is configured to:
receive an aspect term-sentence pair, the aspect term-sentence pair comprising an aspect term and a sentence, and the sentence comprising the aspect term;
embed the aspect term-sentence pair to obtain an embedding of each word in the sentence;
parse the sentence using a plurality of parsers to obtain a plurality of dependency trees;
perform edge union on the plurality of dependency trees by taking a union of all edges in the plurality of dependency trees from the plurality of parsers to obtain a merged graph, wherein each node and each edge in the plurality of dependency trees are included in the merged graph, and wherein parent-to-child relations between nodes are retained in the merged graph while discarding parser-specific relation types;
represent each node in the merged graph by corresponding one of the embeddings of the words to obtain a relation graph;
perform a relation neural network on the relation graph to obtain updated relation neural network;
extract a hidden representation of the aspect term from the updated relation neural network to obtain an extracted representation of the aspect term; and
classify the aspect term based on the extracted representation to obtain a predicted classification label of the aspect term.

2. The system of claim 1, wherein the computer executable code is further configured to, when the aspect term-sentence pair is a training aspect term-sentence pair and the aspect term has a classification label in regard to the sentence:
receive the classification label of the aspect term;
calculate a loss function based on the predicted classification label of the aspect term and the classification label of the aspect term; and
adjust model parameters in the computer executable code based on the loss function.

3. The system of claim 1, wherein the computer executable code is further configured to add a position dimension to the embedding of each of the words.

4. The system of claim 1, wherein the number of the plurality of parsers is three, and the three parsers are CoreNLP, Stanza, and Berkeley neural parser.

5. The system of claim 1, wherein the computer executable code is further configured to add a child-to-parent relation to each parent-to-child relation to the merged graph, and add a self-loop to each node in the merged graph, so as to obtain the relation graph.

6. The system of claim 1, wherein the relation neural network is a relational graph attention network (RGAT).

7. The system of claim 6, wherein the hidden representation of node i in the relation graph at l-th layer of the RGAT is calculated by:

$$h_i^{(l)} = \|_{k=1}^{K} \sigma(\Sigma_{j \in N_i} \alpha_{ij}^k W^k h_i^{(l-1,k)})$$

wherein K is a number of attention heads, $N_i$ is a neighborhood of node i in the relation graph, $\|$ is a concatenation operation, $W^k$ represents learnable weights in the RGAT, and $\sigma$ represents a ReLU activation function, and $\alpha_{ij}^k$ is an attention score between node i and node j with head k.

8. The system of claim 1, wherein the computer executable code is further configured to, when the aspect term comprises of at least two words, average the extracted hidden representations of the at least two words to obtain the hidden representation of the aspect term.

9. The system of claim 1, wherein the computer executable code is configured to classify the aspect term using a two layer multilayer perceptron (MLP).

10. The system of claim 1, wherein the classification labels comprise of a positive sentiment, a neutral sentiment, and negative sentiment.

11. A method comprising:
receiving, by a computing device, an aspect term-sentence pair, the aspect term-sentence pair comprising an aspect term and a sentence, and the sentence comprising the aspect term;
embedding, by the computing device, the aspect term-sentence pair to obtain an embedding of each word in the sentence;
parsing, by the computing device, the sentence using a plurality of parsers to obtain a plurality of dependency trees;
performing edge union, by the computing device, on the plurality of dependency trees by taking a union of all edges in the plurality of dependency trees from the plurality of parsers to obtain a merged graph, wherein each node and each edge in the plurality of dependency trees are included in the merged graph, and wherein parent-to-child relations between nodes are retained in the merged graph while discarding parser-specific relation types;
representing, by the computing device, each node in the merged graph by corresponding one of the embeddings of the words to obtain a relation graph;
performing a relation neural network, by the computing device, on the relation graph to obtain updated relation neural network;
extracting, by the computing device, a hidden representation of the aspect term from the updated relation neural network to obtain an extracted representation of the aspect term; and
classifying, by the computing device, the aspect term based on the extracted representation to obtain a predicted classification label of the aspect term.

12. The method of claim 11, further comprising, when the aspect term-sentence pair is a training aspect term-sentence pair and the aspect term has a classification label in regard to the sentence:
receiving the classification label of the aspect term;
calculating a loss function based on the predicted classification label of the aspect term and the classification label of the aspect term; and
adjusting model parameters in the computer executable code based on the loss function.

13. The method of claim 11, further comprising: adding a position dimension to the embedding of each of the words.

14. The method of claim 11, wherein the number of the plurality of parsers is three, and the three parsers are CoreNLP, Stanza, and Berkeley neural parser.

15. The method of claim 11, further comprising: adding a child-to-parent relation to each parent-to-child relation to the merged graph, and adding a self-loop to each node in the merged graph, so as to obtain the relation graph.

16. The method of claim 11, wherein the relation neural network is a relational graph attention network (RGAT).

17. The method of claim 11, wherein the classification labels comprise of a positive sentiment, a neutral sentiment, and negative sentiment.

18. A non-transitory computer readable medium storing computer executable code, wherein the computer executable code, when executed at a processor of an active computing device, is configured to:
receive an aspect term-sentence pair, the aspect term-sentence pair comprising an aspect term and a sentence, the sentence comprising the aspect term, and the aspect term having a classification label;
embed the aspect term-sentence pair to obtain an embedding of each word in the sentence;
parse the sentence using a plurality of parsers to obtain a plurality of dependency trees;
perform edge union on the plurality of dependency trees by taking a union of all edges in the plurality of dependency trees from the plurality of parsers to obtain a merged graph, wherein each node and each edge in the plurality of dependency trees are included in the merged graph, and wherein parent-to-child relations between nodes are retained in the merged graph while discarding parser-specific relation types;
represent each node in the merged graph by corresponding one of the embeddings of the words to obtain a relation graph;
perform a relation neural network on the relation graph to obtain updated relation neural network;
extract a hidden representation of the aspect term from the updated relation neural network to obtain an extracted representation of the aspect term;
classify the aspect term based on the extracted representation to obtain a predicted classification label of the aspect term;
calculate a loss function based on the predicted classification label of the aspect term and the classification label of the aspect term; and
adjust model parameters of models in the computer executable code based on the loss function.

19. The non-transitory computer readable medium of claim 18, wherein the computer executable code is further configured to, when the aspect term-sentence pair is a training aspect term-sentence pair and the aspect term has a classification label in regard to the sentence:

receive the classification label of the aspect term;

calculate a loss function based on the predicted classification label of the aspect term and the classification label of the aspect term; and adjust model parameters in the computer executable code based on the loss function.

20. The non-transitory computer readable medium of claim 18, wherein the computer executable code is further configured to add a position dimension to the embedding of each of the words, add a child-to-parent relation to each parent-to-child relation to the merged graph, and add a self-loop to each node in the merged graph, so as to obtain the relation graph.

\* \* \* \* \*